US008154608B2

United States Patent
Ishii

(10) Patent No.: US 8,154,608 B2
(45) Date of Patent: Apr. 10, 2012

(54) DIGITAL CAMERA SECURITY

(75) Inventor: Kensuke Ishii, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 690 days.

(21) Appl. No.: 11/939,271

(22) Filed: Nov. 13, 2007

(65) Prior Publication Data

US 2009/0122149 A1 May 14, 2009

(51) Int. Cl.
*H04N 5/232* (2006.01)

(52) U.S. Cl. .................. 348/211.1; 348/231.6

(58) Field of Classification Search .......... 348/207.99, 348/207.11, 207.1, 211.99, 211.1, 211.2, 348/211.3, 211.4, 211.6, 231.3, 231.6, 231.9
See application file for complete search history.

(56) References Cited

U.S. PATENT DOCUMENTS

| | | | | |
|---|---|---|---|---|
| 7,236,185 B2 * | 6/2007 | Terada et al. | ............ | 348/207.11 |
| 7,301,442 B2 * | 11/2007 | Kolpasky et al. | ........ | 340/426.13 |
| 7,382,405 B2 * | 6/2008 | Kusaka et al. | ............ | 348/231.6 |
| 2003/0163716 A1 * | 8/2003 | Robins et al. | ................ | 713/193 |
| 2004/0051787 A1 * | 3/2004 | Mutsuro et al. | .......... | 348/211.99 |
| 2004/0087273 A1 * | 5/2004 | Perttila et al. | ................ | 455/41.2 |
| 2004/0105008 A1 * | 6/2004 | Yamazaki | .................. | 348/207.1 |
| 2004/0135887 A1 * | 7/2004 | Tecu et al. | .................. | 348/207.1 |
| 2004/0174435 A1 * | 9/2004 | Kondoh | .................. | 348/211.99 |
| 2004/0201739 A1 * | 10/2004 | Kuwayama | ................ | 348/231.3 |
| 2005/0179811 A1 * | 8/2005 | Palatov | ......................... | 348/373 |
| 2006/0007319 A1 * | 1/2006 | Kitawaki | ................ | 348/211.99 |

\* cited by examiner

*Primary Examiner* — Lin Ye
*Assistant Examiner* — Chriss Yoder, III
(74) *Attorney, Agent, or Firm* — Sheppard Mullin Richter & Hampton LLP

(57) ABSTRACT

An image capture device, includes a body; an image sensor in the body; a lens configured to focus a scene onto the image sensor; a communications interface in the body; an image processor coupled to receive device information from an external device; a controller coupled to the communications interface and configured to control operations of the digital camera; and executable code embodied in a computer readable medium and configured to cause the controller to configure operational parameters of the digital camera based on information received from the external device. Examples of operational parameters that can be configured include locking and unlocking of the image capture device, encryption or other encoding of captured images, and device settings and configuration.

24 Claims, 17 Drawing Sheets

DIGITAL CAMERA SECURITY

TECHNICAL FIELD

The present invention relates to digital image devices, and more particularly, some embodiments relate to security systems for image capture and related devices.

DESCRIPTION OF THE RELATED ART

Photography is derived from the Greek words photos, meaning light, and graphein, meaning to draw. It is widely believed that the word was first used by the scientist Sir John F. W. Herschel in 1839. Photography originally involved the recording of images as a result of light impinging on a photosensitive material. Early photographs were exposed as positives onto metal plates that had been sensitized to accept the image. Examples of such include Daguerréotypes, which were metal sheets upon which a positive silver image was made, and tintypes, in which a thin sheet of iron provided a base for light-sensitive material. It is William Henry Fox Talbot, however, that is often credited with inventing a process of capturing the image on a negative, and using the negative to create prints. Eventually, photography evolved into a process by which the sensitized materials were coated on plate glass.

Perhaps the most significant historical advancement was in 1889, when George Eastman used a film comprised of emulsions coated on a flexible base. The flexibility this film meant that it could be rolled into a smaller package, enabling cameras to be made much smaller than was previously practical. This enabled small, cost effective cameras to be mass produced and available to the public in unprecedented volumes. Later, color films were introduced and made commercially viable.

Photography has evolved from its earliest forms into a variety of different photographic platforms. For example, other forms of radiation such as infrared, X-Ray or other radiation might be used to record images. As yet a further example of the evolution of photography, sequences of images can be captured and replayed as motion pictures. More recently, a major advancement of photography has been the commercialization of digital still and motion photography. With digital cameras for digital still and motion photography, light sensitive semiconductor devices, such as charge-coupled devices, are used to capture the image and processing technology is used to capture the image and store it in a memory or other storage device.

With advances in electronics, consumers have available to them a multitude of photographic and other image capture devices that were previously unavailable. Improvements in power consumption, storage densities, miniaturization and display technology, to name a few, have enabled rapid advances in image capture devices. Take, for instance, electronic content capture, storage, view and delivery devices such as, for example, digital cameras (including still and video cameras) and the like. Such devices are commonplace in contemporary society at the consumer, professional and prosumer level. Digital cameras, camera phones, video cameras and players, digital photo albums, and other image capture devices are seemingly ubiquitous. With the proliferation of such image capture devices, more and more users are seeking the ability to share images amongst their family, friends and coworkers. Digital still and motion images are frequently transferred electronically among these groups using, for example, email and other transport mechanisms.

BRIEF SUMMARY OF EMBODIMENTS OF THE INVENTION

According to various embodiments of the invention, a digital camera is configured to operate with an external device and to set operational parameters based on information received from the external device. For example, an external device can be configured as a key to enable operation of the digital camera when the device ID of the external device is received and recognized. Additionally, in this example, the camera can be configured to be disabled in the absence of a valid key.

As another example, the camera can be configured such that the key (or, more generally, the external device) establishes a particular configuration for the camera. For instance, in one embodiment, the camera is configured to recognize the key, and to retrieve configuration information specific to the recognized key and to further configure the camera accordingly. Thus, for example, multiple keys can be used by different persons, and the camera can be configured to personalize its settings for the user upon recognizing the user's key.

As still another example, the camera can be configured to encrypt or otherwise encode image data with encryption techniques specific to a recognized external device. For instance, the camera might be configured to recognize the external device and to use the device ID as an encryption key or to generate or retrieve an encryption key with which images are encrypted. As with the above example, different devices might be used to provide different encryption keys such that images can be secured for various users of the same device.

As yet another example, the camera can be configured to download or share images only with authorized devices. Accordingly, in one embodiment, the camera can be configured to store device IDs for authorized devices and share images or other information only with recognized devices.

a digital camera includes: a body; an image sensor in the body; a lens configured to focus a scene onto the image sensor; a communications interface in the body and configured to receive device information from an external device; a controller coupled to the communications interface and configured to control operations of the digital camera; and executable code embodied in a computer readable medium and configured to cause the controller to configure operational parameters of the digital camera based on information received from the external device. According to one embodiment, the executable code further comprises executable code configured to cause the controller to store selected operational parameters associated with the external device and to register the associated external device with the stored operational parameters. The stored operational parameters can be, for example, specified by a user during registration of the external device.

In one embodiment, the executable code configured to cause the controller to configure operational parameters of can include code configured to cause the controller to enable operation of the digital camera when the external device is in communicative contact with the communications interface, and to disable operation of the digital camera when the external device is not in communicative contact with the communications interface. In another embodiment, the executable code configured to cause the controller to configure operational parameters can include executable code configured to unlock the digital camera when the external device is in communicative contact with the communications interface, and to lock the digital camera when the external device is not in communicative contact with the communications interface. In yet another embodiment, the executable code configured to cause the controller to configure operational parameters can include executable code configured to cause the controller to encode images with a key based on the information received from the external device. In still another embodiment, the executable code configured to cause the controller to configure operational parameters can include executable code configured to set the configuration of the digital camera based on the information received from the external device.

In one embodiment, the information received from the external device comprises a device ID and the device ID is used as an encryption key or used to generate an encryption key for encoding images captured by the digital camera, wherein the encryption key is specific to the external device. In a further embodiment, the executable code is further configured to cause the controller to decode images using a decryption key based on the device ID of the external device. In still a further embodiment, the executable code is further configured to cause the controller to transfer captured images to the external device after determining that the external device is authorized to receive the captured images. Additionally, the executable code can be further configured to cause the controller to decode the captured images prior to transferring them to the external device.

In another embodiment, the information received from the external device comprises a device ID and the executable code is configured to cause the controller to retrieve operational parameters for the digital camera associated with the device ID, and to configure the digital camera according to the retrieved operational parameters. In yet a further embodiment, the camera configuration comprises camera settings specific to the external device or devices associated with the device ID. In still another embodiment, the executable code is configured to cause the controller to automatically retrieve the operational parameters and configure the digital camera when the external device comes into communicative contact with the digital camera.

In another embodiment, the digital camera receives a device ID from the external device and the executable code is configured to cause the controller to check the device ID of the external device and to enable operation of the digital camera only when the external device has been previously registered as an authorized device.

In a further embodiment, a method for controlling operational parameters of a digital camera includes: establishing a communication link with an external device; receiving device information from the external device; determining operational parameters of the digital camera based on information received from the external device; and configuring operational parameters of the digital camera using the determined operational parameters. In one embodiment, the method further includes storing selected operational parameters associated with the external device and registering the associated external device with the selected operational parameters. In another embodiment, configuring operational parameters comprises configuring the digital camera to be enabled for operation when the external device is in communicative contact with the communications interface, and disabled when the external device is not in communicative contact with the communications interface.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope or applicability of the invention. It should be noted that for clarity and ease of illustration these drawings are not necessarily made to scale.

Some of the figures included herein may illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
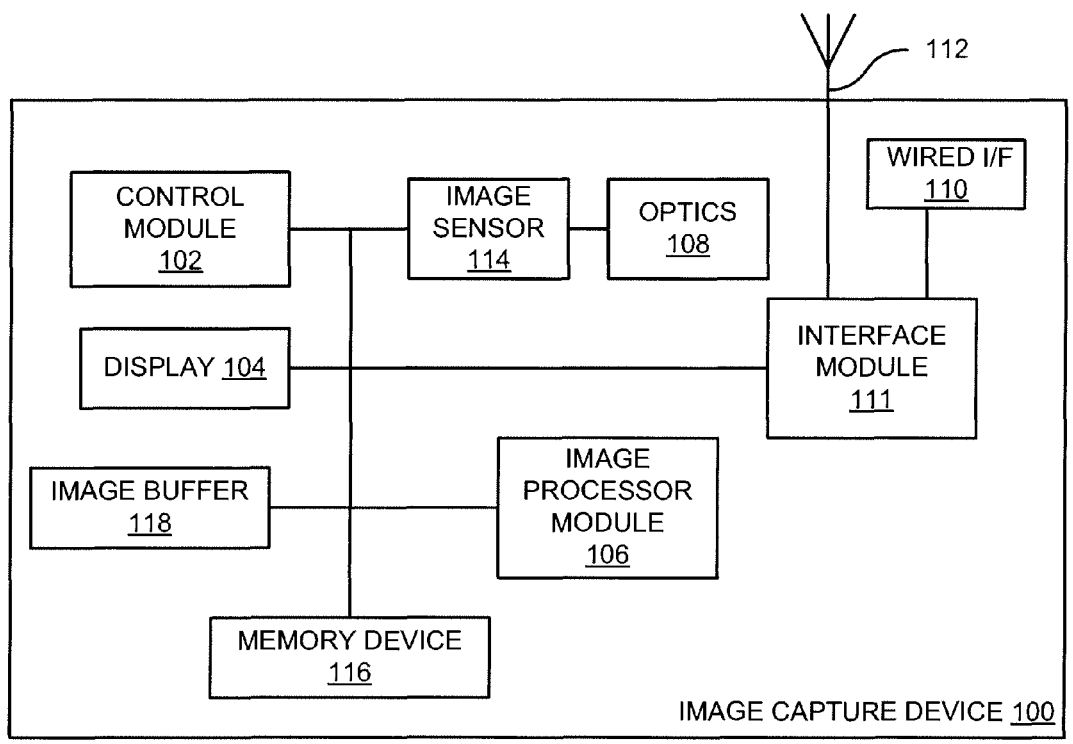
FIG. 1 is a diagram illustrating an exemplary block diagram of an image capture device in accordance with an example environment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for a providing a measure of security for image content devices such as, for example, digital still and motion image cameras, and other electronics devices capable of storing, transferring or displaying images. Particularly, in one embodiment, an electronic wireless key is provided to unlock or otherwise control operational characteristics of a content device. In another embodiment, the capabilities are used to allow certain images to be selected from a group of images. In a further embodiment, additional partner devices can be provided with a key to facilitate operational characteristics of the content device and to facilitate content sharing. Further embodiments and features can be provided, some of which are described in detail below.

Before describing the invention in detail, it is useful to describe an example electronic device with which the invention can be implemented. One such example is that of a digital camera capable of capturing still and motion picture images. In one example, a digital camera can include a series of optical elements (i.e., a lens) that is configured to focus light to create an image of a scene. With digital cameras, however, instead of focusing this light onto a conventional light sensitive film at the focal plane, the scene is typically focused onto a semiconductor image sensor, such as, for example, a CCD (charge-coupled device) or CMOS (complementary metal oxide semiconductor) image sensor. These image sensors have several cells, corresponding to pixels, that respond electronically to the light focused thereon by the lens. In other words, the image sensors convert light into electrons. The accumulated charge for each cell is read out as an electrical signal, which, for a CCD, is converted into a digital pixel value in binary form. The CMOS signal is digital, so conversion is not necessary. The electrical signals created are clocked out of the sensor and processed into an image comprised of several digital pixels. The images can be stored locally in fixed or removable memory and later transferred to a computer or other external host.

Because a digital image is created and stored, it can also be displayed. This allows the photographer to view the image on a display after the photograph is taken. LCD display panels, for example, are commonplace on digital cameras and digital video cameras to allow image viewing. As such, electrical interfaces and drivers are provided to allow a preview of the image to be viewed as well as to display the exposed image stored in memory. Such displays might also provide a user interface for additional features such as displaying exposure characteristics, facilitating camera set up through menus or other like means, as well as displaying operational modes of the camera (for example, flash status, exposure compensation, focus mode, shutter/aperture settings and the like). Some cameras even use touch screen displays as a form of user interface to allow control and selections to be performed with a minimal use of buttons and switches. This is popular with some digital video cameras.

The devices might further include a user interface to allow users to identify features or characteristics to be used to search for and identify such images, to allow users to store and view features for later selection and use, and to store profiles or operations that can be performed on identified or selected images. Additionally wired or wireless data transfer capabilities can be included to allow selected images to be transferred among electronic devices. In the case of a digital camera or other device, the user interface might include, in addition to a GUI, keys, buttons, switches, thumb wheels, d-pads, joysticks or other input devices to allow the entry of user data and commands.

FIG. 1 is a diagram illustrating a block diagram of an exemplary image capture device in accordance with one example environment for the invention. Referring now to FIG. 1, the example image capture device 100 illustrated includes a controller 102, a interface module 110, an image processing module 106, optics 105, an image sensor 114, a wireless interface 112, a hardwired interface 110, a memory or other storage device 116, a removable storage device 118, an image buffer 120, and a display 124. Display 104 might be an LCD or other like display configured to display a scene to be selected for photographing, a captured image, camera menus, camera settings, image data and other features.

In the illustrated example implementation, image capture device 100 includes one or more optical elements 108 that can be used to capture a scene and focus the scene onto a focal plane. Optics 108 might typically include a plurality of optical elements that are configured to operate together to provide the ability to zoom into and out of the scene as well as to focus the scene onto the focal plane. Optical elements 108 can be implemented in a relatively simple fashion such as, for example, a fixed-aperture single-element lens, or a more complex structure such as a multi-element variable-aperture lens. Additionally, manual or auto focusing features can be provided.

As noted, optics 108 are typically used to focus a scene onto a focal plane. An image sensor 114 might be provided at the focal plane to receive the optical image and convert it into an electrical signal representative thereof. As discussed above, an image sensor 114 might be implemented as a CCD or CMOS image sensor, which is a semiconductor device configured to accept the light focused thereon and output an electrical representation of the optical image. Depending on the type of image sensor utilized, an analog-to-digital converter might be provided to divert the electrical signals to a digital format such that the image can be processed, for example, by an image processing module 106. Image sensors might be implemented to provide color data for color images.

An image processing module 106 can be included to process the digital image data to create a digital picture or digital rendition of the image captured. For example, image processing might include processing functions used to format the digital data into an appropriate image format, perform any desired image processing such as, for example, sharpening, smoothing, white balancing, and so on; performing image compression, and creating the appropriate image file format such as, for example, JPEG, TIFF and the like.

A processed image or a raw image file might be stored on a variety of storage devices such as, for example, a memory device 116 or a removable memory element 118. For example, various forms of internal and removable memory might be provided to facilitate local storage as well as removable storage. An example of removable memory might include, for example, a removable flash memory card. Also illustrated in the example of FIG. 1 is an image buffer 120 that might be provided to buffer the processed image for display on display 104. Image buffer might also be used to buffer for display preview images before a picture is actually taken. Memory device 116 might also store software or other processing functions used to process images or otherwise control the operation of image capture device 100. Additionally, memory device 116 might store menu screens and other like devices for display to the user during set up or configuration operations.

A controller 102 might be provided to control the various functions of the image capture device 100 as described herein. A controller 102 might be implemented utilizing various forms of control logic including, for example, processors, controllers, microcontrollers, ASICs, PLAs, discrete logic and the like. For example, a controller 102 might control functions such as auto-focus functions, camera set-up functions, image transfer functions, image recognition and selection functions, and so on.

Also illustrated in the image capture device 100 of FIG. 1 is an interface module 111 that is communicatively coupled to a wired interface 110 and a wireless interface 112. Such an interface module 110 might be included to facilitate the transfer of images from the content device to various other devices, including printers, other cameras, computer systems, networks and the like. Wired or wireless interfaces can be used to transfer data to and from the camera, as can a removable memory card or other storage media. A variety of communication protocols might be implemented to provide the interface depending on the operational environment anticipated. For example, the bandwidth required for transferring images, the desired range of operation, the desired speed of operation, and other like parameters may drive the choice of the wireless interface.

One example of a wired interface is a USB interface that allows the camera to download images to a printer, electronic photo album, host computer or other partner device. Indeed, some cameras are viewable as a USB mass storage device. Another example of a wired interface is a FireWire interface. Wireless interfaces are becoming more commonplace and can include interfaces such as, for example, the IEEE 802 family of standards dealing with wireless networks including IEEE 802.15.1 (BlueTooth®), IEEE 802.11 (WiFi), IEEE 802.16 (WiMax), IEEE 802.15.1 (ZigBee), and the like. Other examples of wireless interfaces that can be used are the WiMedia and other UWB interfaces. In addition to these standards-based interfaces, proprietary interfaces might also be utilized.

Additionally, hardwired interfaces to facilitate image sharing can be included separate from or complimentary with wireless interface 112. For example, a wired interface 110 might be used to facilitate faster image transfer or to accommodate higher bandwidth than wireless interface 112. Additionally, a wired interface might provide features such as power transfer to allow the device to be powered by a power source. As this example illustrates, a wired interface might be as simple as a pair of power connections to a powering or charging of the display, or might be configured to include additional connection for serial or parallel data communication.

From time-to-time, the present invention is described herein in terms of this example content capture device. Description in terms of this environment is provided to allow the various features and embodiments of the invention to be portrayed in the context of an exemplary application. After reading this description, it will become apparent to one of ordinary skill in the art how the invention can be implemented in different and alternative electronic devices beyond still and motion digital cameras.

Having thus described an example digital image capture device with which the present convention can be implemented, an example operation various features and embodiments that can be provided are now described. The present invention is directed toward a system and method for providing security, keying, configuration or other features or operating parameters to a content capture device such as, for example a digital camera or other image capture device 100. In accordance with one or more embodiments, one or more features or operating parameters might be included and configurable such as, for example, device activation/deactivation, device feature lockout, device configuration, operation with external devices, user-specific or key-specific encryption, user or key configuration, and others.

Figure 2:
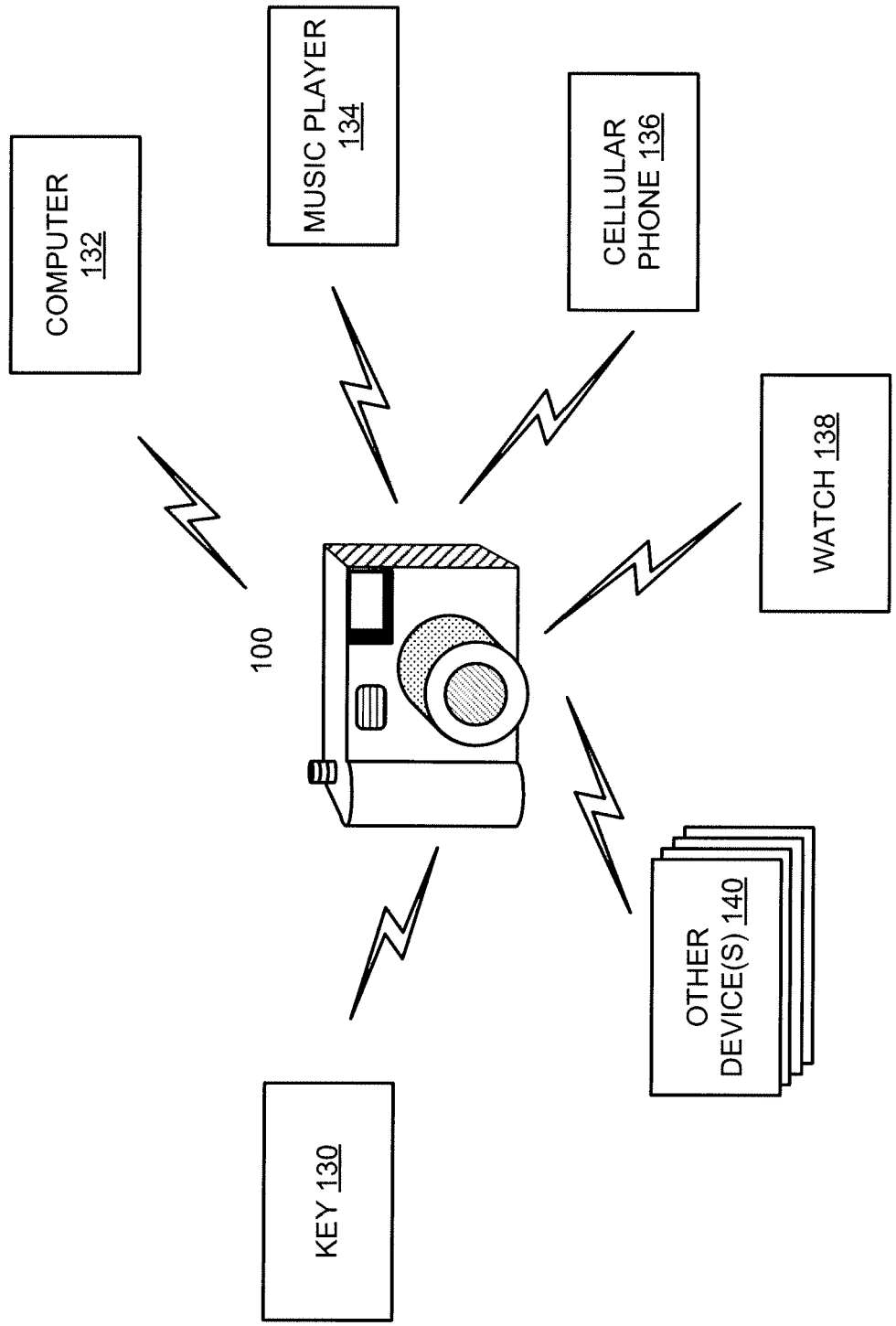
FIG. 2 is a diagram illustrating an example some devices with which an image capture device or other device can operate in accordance with one embodiment of the invention.

FIG. 2 is a diagram illustrating an example of other devices with which an image capture device 100 or other device can operate in accordance with one embodiment of the invention. Referring now to FIG. 2, a digital still camera 100 is illustrated as being capable of associating with various other devices such as a computer 132, a music player 134, a cellular phone 136, a watch 138 and various other devices 140. Preferably, camera 100 communicates with these devices wirelessly, although hardwired interfaces could also be provided. Also illustrated is a key 130 that is configured to come into communicative contact with camera 100.

In one embodiment, key 130 can be a master key that can be used to "unlock" digital camera 100. Preferably, in one embodiment, key 100 is put into communicative contact with camera 100 via a wireless interface. Camera 100 can be configured to enter an operational mode upon sensing the presence of key 130.

In one embodiment, key 130 can be used simply to enable or disable the operation of camera 100. In other words, key 130 might be configured to act as a keying device that 'turns on' the camera 100 when the key 130 is recognized by camera 100, and the camera 100 is 'turned off' the camera when a valid key is absent. For example, when key 130 is in the presence of camera 100 (for example, close enough to allow wireless communication between the two devices) the camera 100 recognizes key 130, validates its presence and allows operation to occur. Accordingly, in one example operational scenario, a user can carry key 130 in his or her pocket, purse, wallet or other convenient location and, when taking pictures, camera 100 senses the presence of key 130 and its operation is enabled. If, on the other hand, the user does not have the key 130 on his or her person (or otherwise in range of camera 100) the camera will not operate. In one embodiment, complete operation of the camera can be disabled absent the presence of the key. In other embodiments, the operating parameters can be controlled such that some or all of the features of the camera can be disabled in the absence of key 130 to provide some measure of security for the device. For example, images may be stored in camera 100 in encrypted files and the decryption can be disabled without the presence of key 130. As other examples, without a key 130, the camera may be configured to disallow the taking of pictures, the transfer of images, saving files, and so on.

As illustrated in FIG. 2, digital camera 100 is configured to interface with a plurality of other devices to enable various features and functionality. For example, camera 100 might be configured to interface with a computer 132 on to which images can be downloaded. For example, after taking a series of photographs, a user may wish to download one or more of the images to his or her computer 132 for further operations. For example, the user may wish to store the images on his or her computer 132, download them to a disk or other media, email them to friends or family, modify the images (for example, using Adobe Photoshop® or other image software) or otherwise manipulate or operate on the images. Likewise, a user may wish to download still images or movies to a music player 134 or cellular phone 136 such that they can be further enjoyed or shared.

In one embodiment, these other devices (for example, computer 132, music player 134, cellular phone 136, watch 138 and other devices 140) can also be configured as keys. For example, in one embodiment, the invention can be configured such that one or more of these devices are registered with camera 100. For example, a device can have a particular serial number, address, MAC address, device ID or other identifier (generally referred to herein as a device ID) to specifically identify that device or a group of devices. A device can be registered with camera 100 and operate according to a defined configuration. For example, in one embodiment, the invention can be configured such that a device is registered with characteristics specific to that device. For example, the user might register computer 132 to camera 100 such that computer 132 is configured to accept images from camera 100. To further elaborate, once computer 132 is registered, camera 100 can be enabled to transfer images to computer 132, but not to other unregistered devices. Camera 100 might be further configured to decrypt images prior to transfer to computer 132. Alternatively, decryption algorithms can be provided at computer 132 to appropriately decrypt the images. As this simple example serves to illustrate, various features and functionality might be accorded upon a device registered with camera 100.

As one example, in one embodiment, the registration associates the device with a specified set of operating parameters. For example, a device type, device class, device ID information can be stored along with a set of characteristics or parameters that define operational features, functions or configurations associated with that device, device type or device class. Accordingly, when that device (or device type or class) is recognized, the associated operational parameters can be looked up and the camera configured accordingly. In another embodiment, operating parameters might be maintained on the external device itself. In such an embodiment, this information can be transferred from the device to the camera when they are in communicative contact and the camera configured based on the information transferred.

Figure 3:
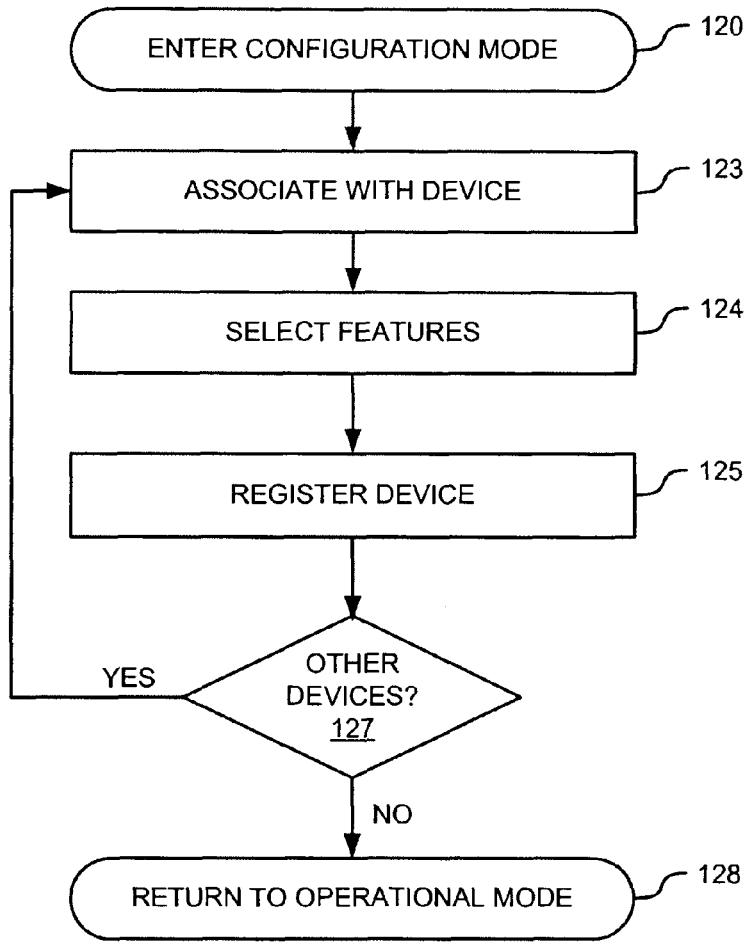
FIG. 3 is a diagram illustrating and example process for device registration in accordance with one embodiment of the invention.

FIG. 3 is a diagram illustrating and example process for device registration in accordance with one embodiment of the invention. Referring now to FIG. 3, in a step 120 the camera enters a configuration mode. In one embodiment, camera 100 is prevented from entering a configuration mode absent the presence of a key 130, or other key as described below. In one embodiment, camera 100 can automatically enter a configuration mode upon sensing presence of key 130 or, alternatively, the configuration mode can be user selected.

In a step 123, camera 100 associates with a chosen device. In this step, communication is initiated between the selected device and camera 100. In a step 124, the user selects one or more features to be enabled with the associated device. For example, in the case of a computer 132, the feature selected might include the ability to transfer images from camera 100 to the associated computer 132, to decrypt the images prior to transfer, to enable operation of camera in the presence of computer 132 and so on. As another example, the user may wish to register another device as a key to enable operation of the camera. The user's cell phone 136, watch 138, wireless key fob, or other device could be associated with camera 100 and registered as a key. In furtherance of this example, consider an example where the user registers his or her cellular phone 136 as a key for camera 100. Camera 100 can be configured such that it operates in the presence of either a master key 130 or the user's cellular phone 136. In this scenario, if the user does not have either the master key or his or her cellular phone 136 in the proximity of camera 100, camera 100 cannot be operated (or features of camera 100 are disabled).

In a step 125, the features or operating parameters selected for the associated device can be stored at camera 100 such that the configuration information can be recalled when the device is present or when camera 100 interacts with the device. As illustrated by step 127, the user can opt to register a plurality of devices and, preferably, each device can be registered with a specific set of features or parameters particular to that device. After one or more devices are registered, the camera can be returned to the operational mode as illustrated by step 128. Accordingly, as FIGS. 2 and 3 illustrate, a camera 100 can be configured such that it can interface with a plurality of devices of various types, and further configured such that camera 100 is provided particular operating characteristics with respect to the associated devices. Accordingly, in one embodiment, device registration can be provided to specify parameters that specify configurations such as, for example, camera security, image security, user-specific configuration, device-specific configuration, or other features or functionality.

As stated above, in one embodiment, devices can be configured and their configuration recognized based on a device ID or other information. For example, a serial number, device identifier, cookie or other identifying information can be provided with the various devices to enable the device to be identified by camera 100. Preferably, each device has a unique identifier such that it can be uniquely identified from among a plurality of devices. Alternatively, device IDs might be shared among a plurality of devices such that each device might not have its own unique identifier. As one example, devices of a similar type might share a common device ID such that features or parameters for that device type or device class can be assigned globally for those devices.

Figure 4:
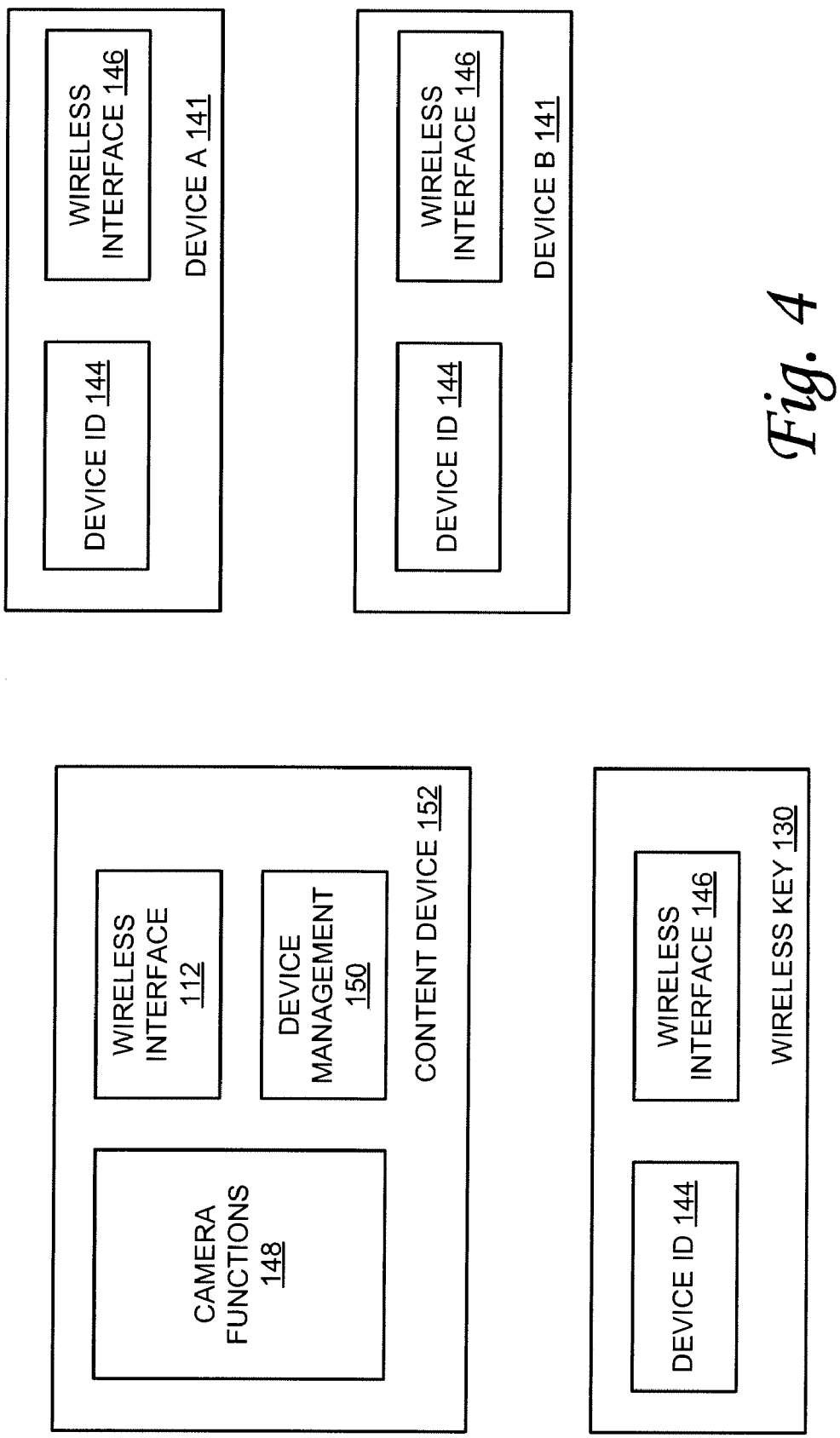
FIG. 4 is a simplified block diagram illustrating a basic configuration of a content capture device and other example devices in accordance with one embodiment of the invention.

FIG. 4 is a simplified block diagram illustrating a basic configuration of a content capture device 100 and example other devices in accordance with one embodiment of the invention. Referring now to FIG. 4, image capture device 100 includes conventional camera functions 148, a device management module 150, and a wireless interface 112. Conventional camera functions 148 can include functions such as, for example, image capture, image processing, and image storage. Wireless interface 112 can be provided to communicate with other devices via their wireless interfaces of 146. Although not illustrated, a hardwired interface can also be provided. Device management 150 can be provided to manage device keys or other registration information for the plurality of devices registered with camera 100. As noted, in one embodiment, each device can have an associated device ID 144. In a further embodiment, device management 150 can store features or parameters associated with each device indexed with the device ID. For example, encryption algorithms can keys, feature sets, or function lists can be stored and managed with device management 150.

Figure 5:
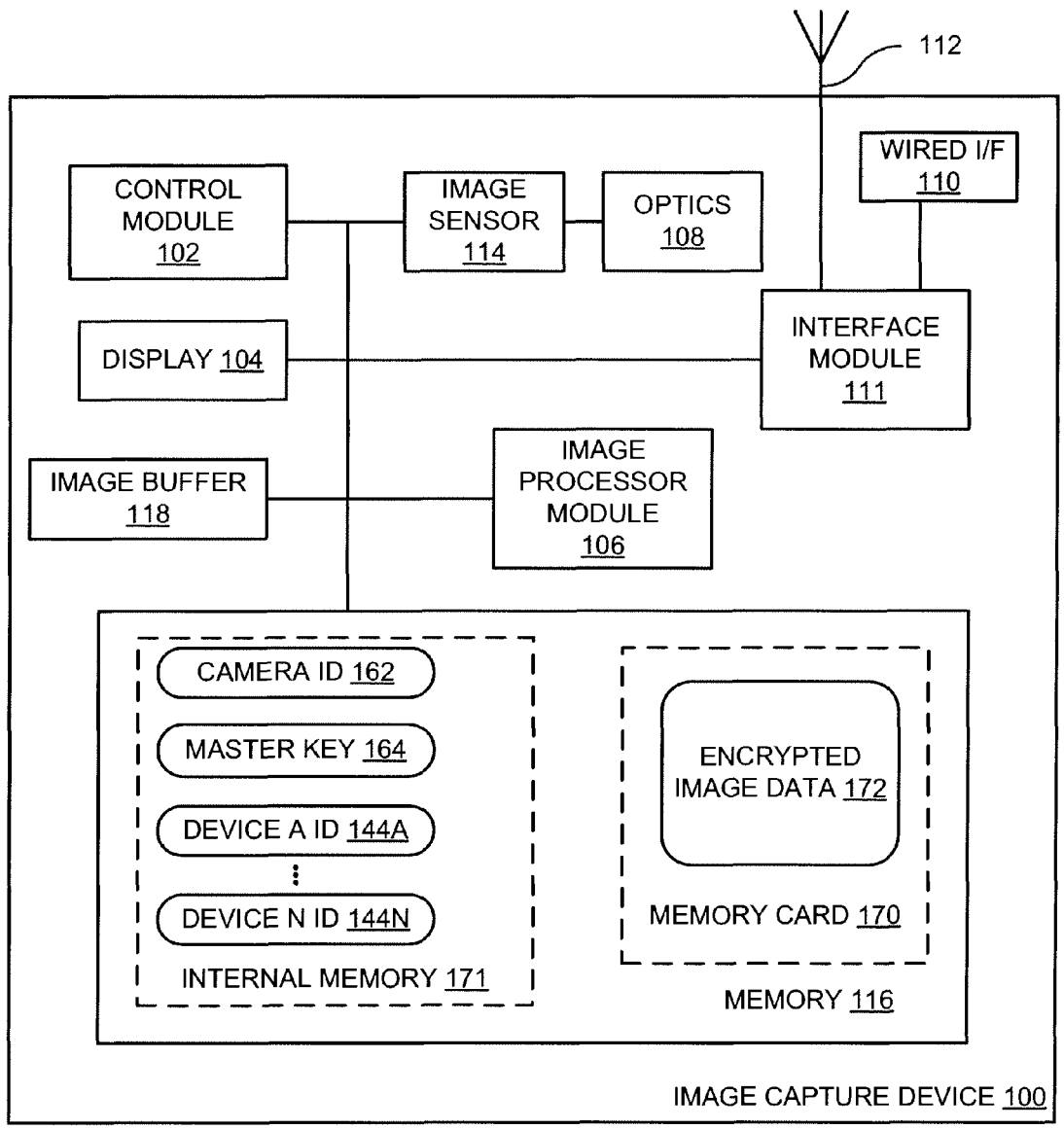
FIG. 5 is a block diagram illustrating an example configuration of an image capture device in accordance with one embodiment of the invention.

FIG. 5 is a block diagram illustrating an example configuration of an image capture device in accordance with one embodiment of the invention. More particularly, in the example illustrated in FIG. 5, a configuration of memory 116 is illustrated as having a portion of memory that can be used to sort information relating to device management (illustrated as being stored in internal memory 171) and a memory card 170 for storing image data 172. As stated above, memory 116 can include one or more fixed or removable memory devices of various configurations. In the illustrated example, device management data is stored in internal memory 171. Inage capture device 100 might be configured in this fashion such that security and operational features are less prone to defeat by removal of a removable memory device. Also in the illustrated example, encrypted image data 172 is illustrated as being stored on a memory card 170. Image data, encrypted or otherwise, can be stored in fixed memory as well as removable memory elements. Although image data is illustrated as being stored as encrypted image 172, unencrypted images can be stored as well.

The data items associated with device management 150 are illustrated in the example of FIG. 5 as including a camera ID 162, a master key identification 164, and one or more device IDs 144A-144N. With this example architecture, a plurality of identifiers can be stored and configuration information associated with the respective devices can also be maintained.

Figure 6:
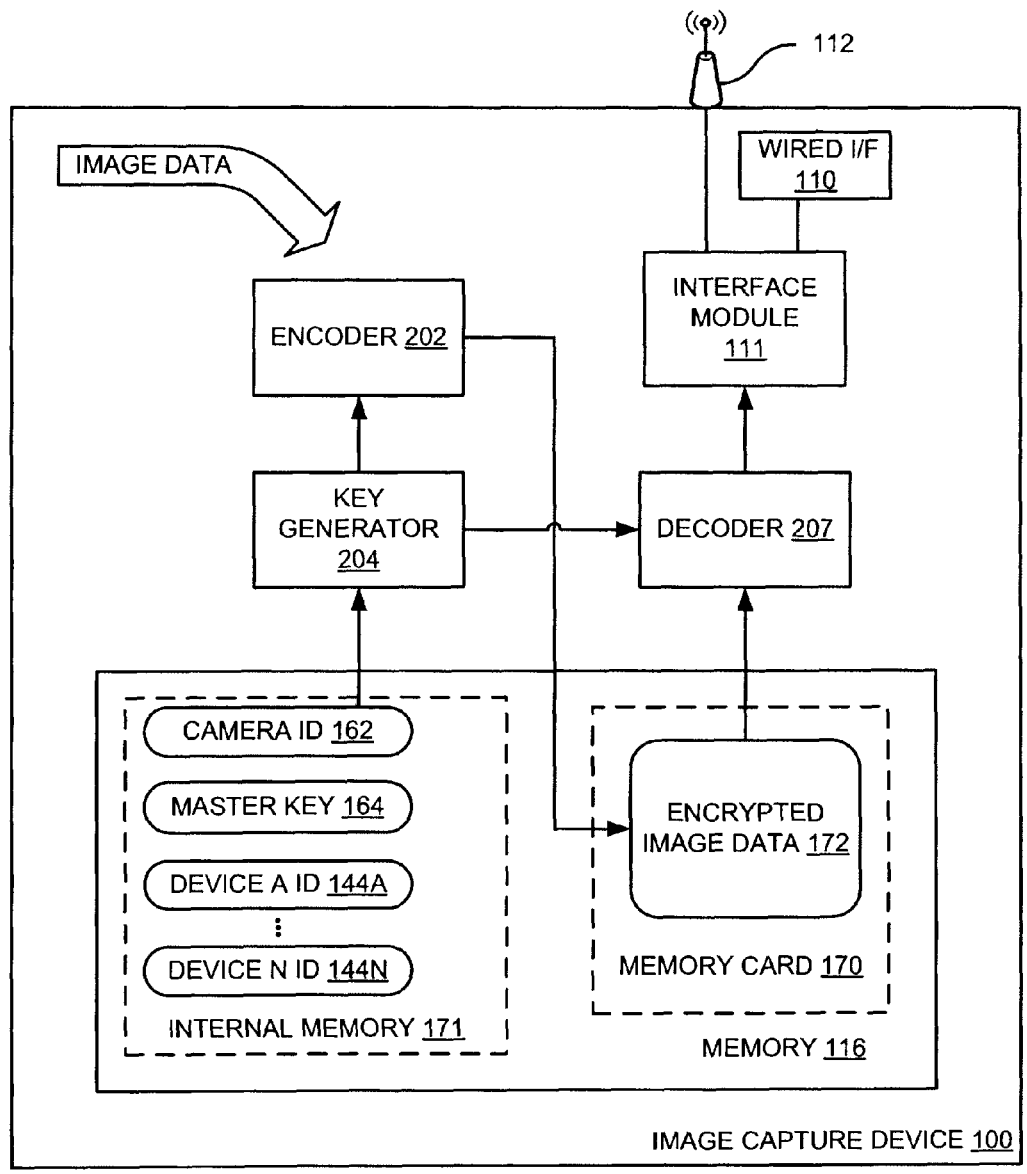
FIG. 6 is a block diagram illustrating an example architecture of an image capture device showing image encoding and decoding in accordance with one embodiment of the invention.

FIG. 6 is a block diagram illustrating an architecture of an image capture device showing image encoding and decoding in accordance with one embodiment of the invention. Referring now to FIG. 6, the example image capture device 100 illustrated includes an image encoder 202, a decoder 207 and a key generator 204. These functions might be implemented for example, by controller 102, image processor module 106 one or more other processing modules or any combination of the above. In the illustrated example, key generator 204 is used to provide an encryption key for encrypting image data using encoder 202. Encrypted image data is stored in memory (on memory card 170 in the illustrated example). Decoder 207 can be provided to decode encrypted images properly when the appropriate key is present.

In the illustrated example, the value that is used to seed key generator 204 is a value obtained or derived from the camera ID 162. Accordingly, in this embodiment, the same seed might be used for key generator 204 for a plurality of registered devices.

Figure 7:
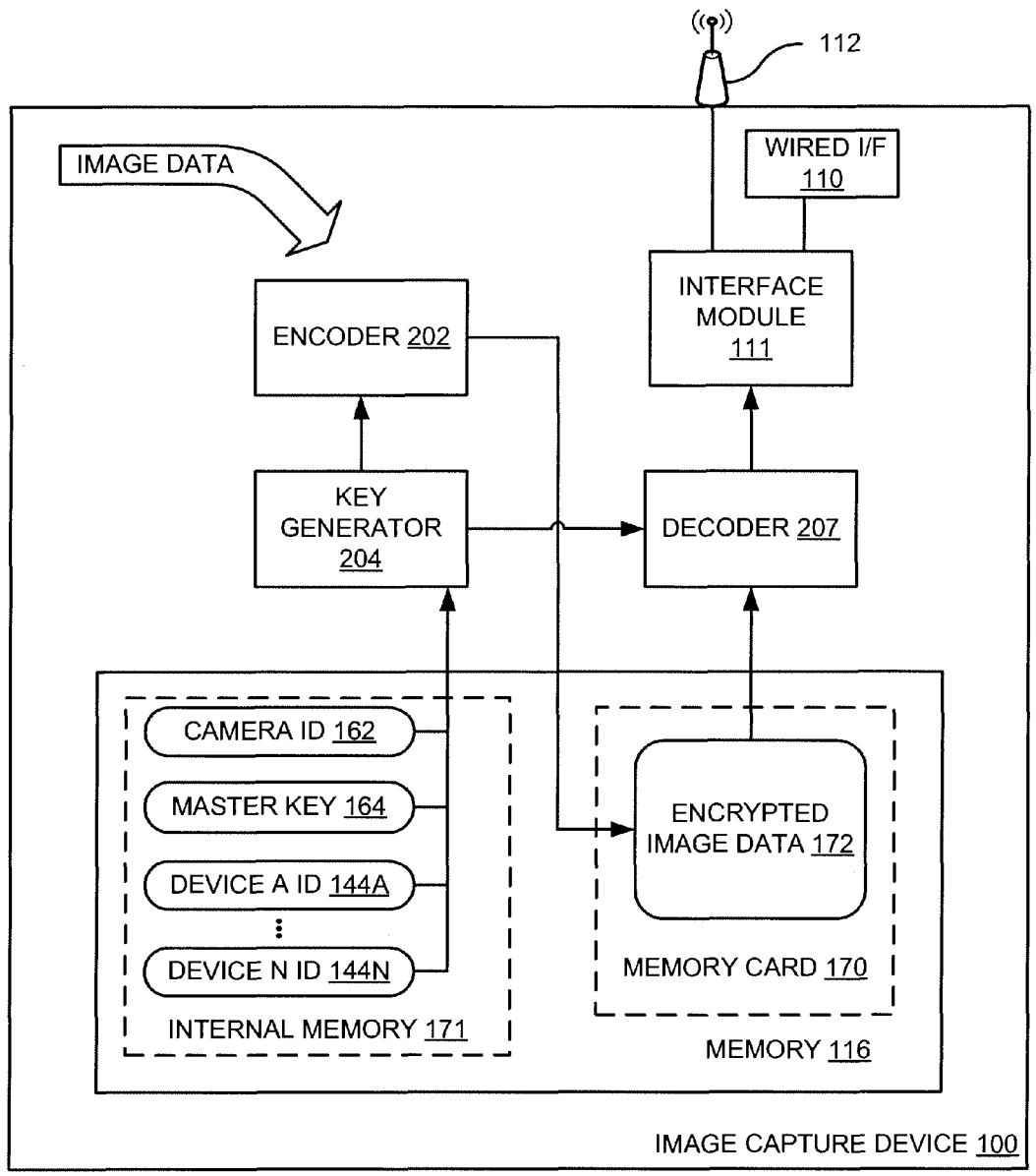
FIG. 7 is a block diagram illustrating an example of an alternative scenario for key management in accordance with one embodiment of the invention.

FIG. 7 is a block diagram illustrating an alternative scenario for key management in accordance with one embodiment of the invention. In the embodiment illustrated in FIG. 7, each device or sets of devices provided a device ID that can be used to provide a seed for key generator 204 (or as the key itself). In the example illustrated in FIG. 7, the device ID for each device is used as a seed for key generator 204 to generate the encryption key. In this embodiment, additional security might be provided in that each device (or sets of devices) will use different keys to decrypt images for display or other operations. Thus, images encrypted for one device using a key specific to that device should not be capable of being decrypted by other devices that do not have that key. In the illustrated embodiment, decryption is provided by decoder 207 on image capture device 100. Accordingly, in such an embodiment, images can be decrypted for a given device prior to downloading the images to that device. Thus, for example, a camera may associate with an approved device, determine that approved device's ID, select or derive the appropriate decryption key accordingly, (to match the key used to encrypt the images for that device), decode the images and transport them to the associated device. In another embodiment, encryption might be performed by an application or module on the associated device itself. In such an embodiment, images can be downloaded from image capture device 100 to the associated device in their encrypted form. The associated device then uses its specific key to decrypt the received images. Various forms of key management can be provided among the devices such that keys can be managed and updated accordingly.

Figure 8:
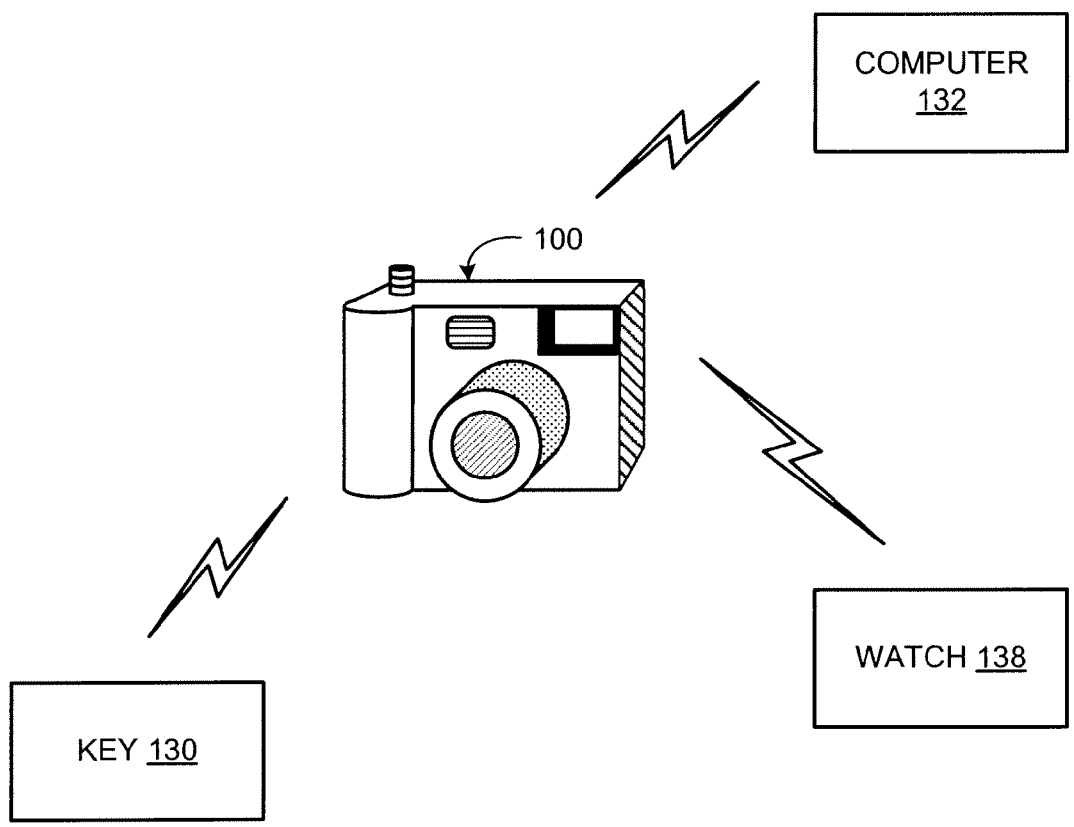
FIG. 8 is a diagram illustrating an example of a camera to be associated with a computer and a watch in accordance with one embodiment of the invention.
Figure 9:
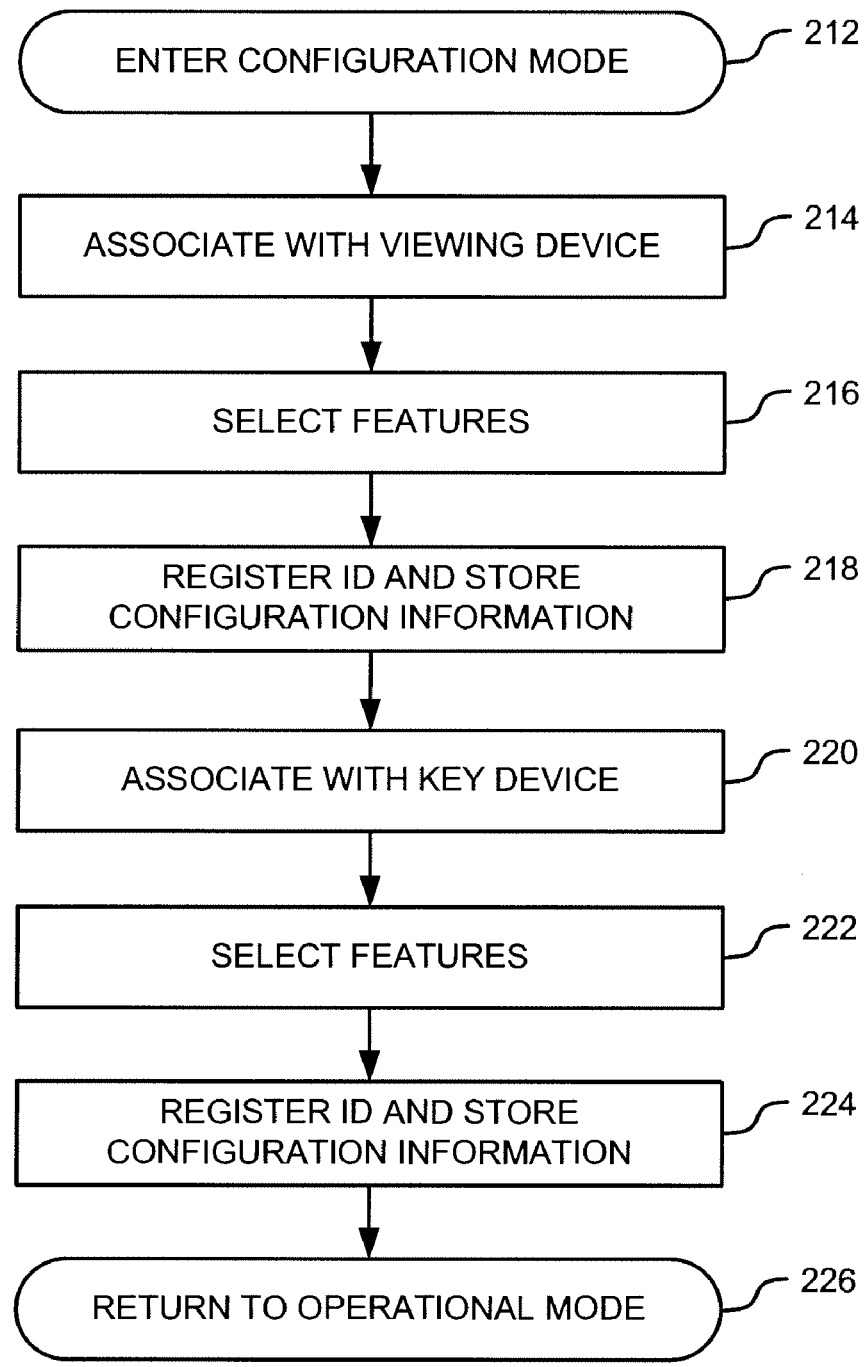
FIG. 9 is an operational flow diagram illustrating an example process for associating camera with these two devices in accordance with one embodiment of the invention.

As stated above, in one embodiment, an image capture device such as camera 100 can be associated with one or more devices and features or functionality associated with such devices can be maintained. FIG. 8 is a diagram illustrating a camera 100 to be associated with a computer 132 and a watch 138 in accordance with one embodiment of the invention. FIG. 9 is an operational flow diagram illustrating an example process for associating camera 100 with these two devices in accordance with one embodiment of the invention. Referring now to FIGS. 8 and 9, in this example scenario, the user wishes to associate camera 100 with his or her computer 132 and watch 138. Assume for purposes of this discussion, that the user wishes to enable his or her laptop computer to be an authorized laptop associated with camera 100 to receive captured images from camera 100. Further assume that the user wishes to authorize his or her watch 138 as a key that can be used to enable some or all of the camera features or functions even in the absence of a master key 130.

Referring now to FIGS. 8 and 9, this example scenario is now described. In a step 212, the user places camera 100 in a configuration mode. In one embodiment, as described above, the presence of key 130 (or other authorized key) might be required to place camera 100 in configuration mode depending on the level of security already present with camera 100.

In a step 214, the user associates camera 100 with the laptop computer 132. In this step, camera 100 and laptop 132 can be placed in communicative contact with one another such that information can be exchanged there between. In another embodiment, communication between the devices is not instituted and the user enters a device ID or other identifying information for laptop computer 132 such that the device can be registered with camera 100.

In a step 216, the user selects the features that he or she wishes to be enabled with laptop 132. According to the example scenario outlined above, the user could select, for example, to provide the camera with permission to download images to laptop 132 for further operation thereon. As also noted, the system can be configured to decrypt the images prior to transmission to laptop 132 or to provided encrypted images to laptop 132 for later decryption.

In a step 218, the configuration information is stored so that the device can be later recognized and the appropriate configuration determined. Accordingly, in accordance with this scenario, when laptop 132 is placed in communicative contact with camera 100, the laptop ID can be looked up, configuration information determined and the images can be downloaded to laptop 132. Preferably, the transfer of images to other non-associated devices can be blocked to provide a measure of security for camera 100. In one embodiment, the presence of a properly designated key might be sufficient to unblock the transfer of images, allowing downloading of images to one or more devices or sets of devices regardless of their association information. Accordingly, a master key, for example, might be used to allow full or complete operation of digital camera 100 regardless of device associations. Alternatively, in another embodiment, camera 100 can be configured such that the presence of a key, even a master key, will not override particular device associations. In yet another embodiment, the level to which a key or a master key might override device association can be configured on a custom basis.

With continued reference to FIG. 8, and continuing with the scenario described above, the user in this example scenario also desired to authorize his or her watch as a device key. Accordingly, as illustrated by steps 220, 222 and 224, the user associates camera 100 with watch 138 selects the features that he or she wishes to enable for watch 138 and the configuration information is stored. In this instance, the information indicates that watch 138 should be recognized as a key. In one embodiment, a set of some or all of features that can be enabled or 'unlocked' by that key can be defined. In a step 226, camera 100 can be returned to the operational mode.

In keeping with the example scenario described above, example operational examples of camera 100 are now described. Because the user's watch 138 was designated as a key for camera 100, camera 100 can now be operated with master key 134 or watch 138. Accordingly, when the user is wearing her watch and she powers on the camera, the camera can be enabled to take pictures, download images or otherwise perform operations authorized for that watch 138 as the key.

Figure 10:
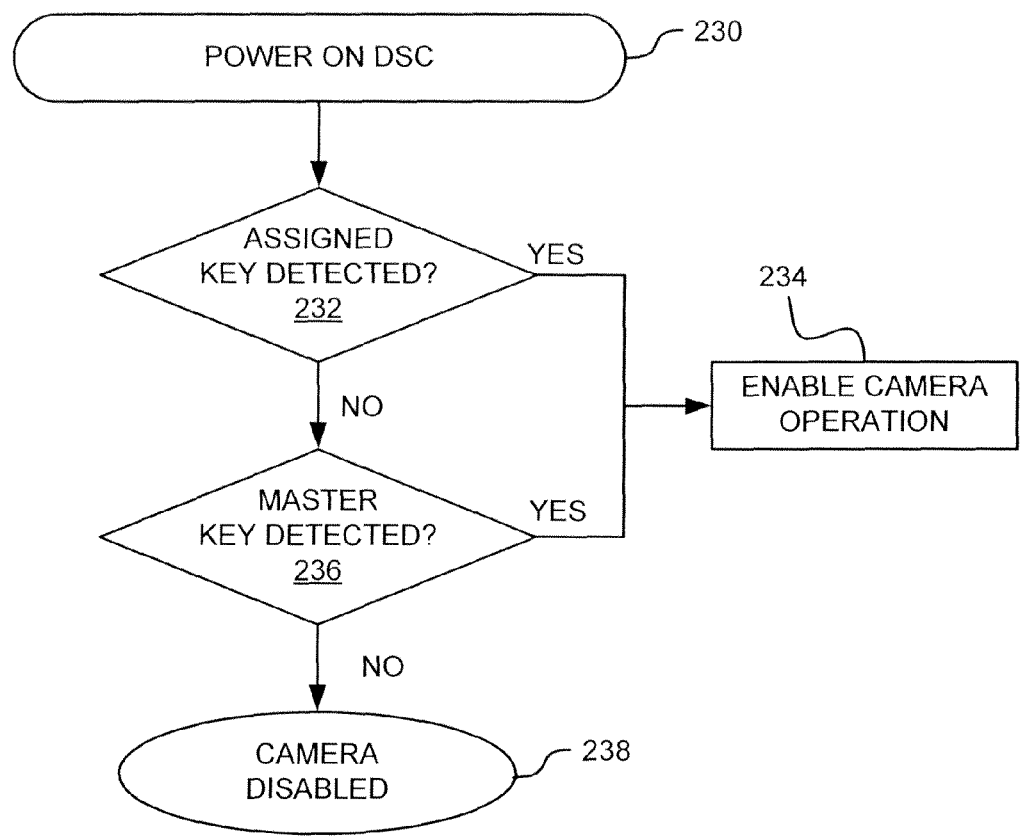
FIG. 10 is an operational flow diagram illustrating a process for enabling camera based on keys in accordance with one embodiment of the invention.

FIG. 10 is an operational flow diagram illustrating a process for enabling camera 100 based on keys in accordance with one embodiment of the invention. Referring now to FIG. 10, in a step 230 the user powers on her digital camera 100. As illustrated by steps 232 and 236, the camera awaits for detection of an assigned key. As noted, this could be either the master key 130 or watch 138. If either key is detected, in a step 234 operation of the camera is enabled. If no keys are detected, operation of camera 100 can be disabled as illustrated by step 238. Accordingly, a measure of security can be provided for the camera 100, inhibiting its operation in the absence of an approved key. In one embodiment, if the camera is lost or stolen, it can be rendered inoperative to the finder or thief without one of the associated keys. Additionally, in embodiments where images are encrypted based on a seed generated from the key or an associated device, in one embodiment, image data stored in the camera or in a memory card in the camera can be somewhat protected.

Figure 11:
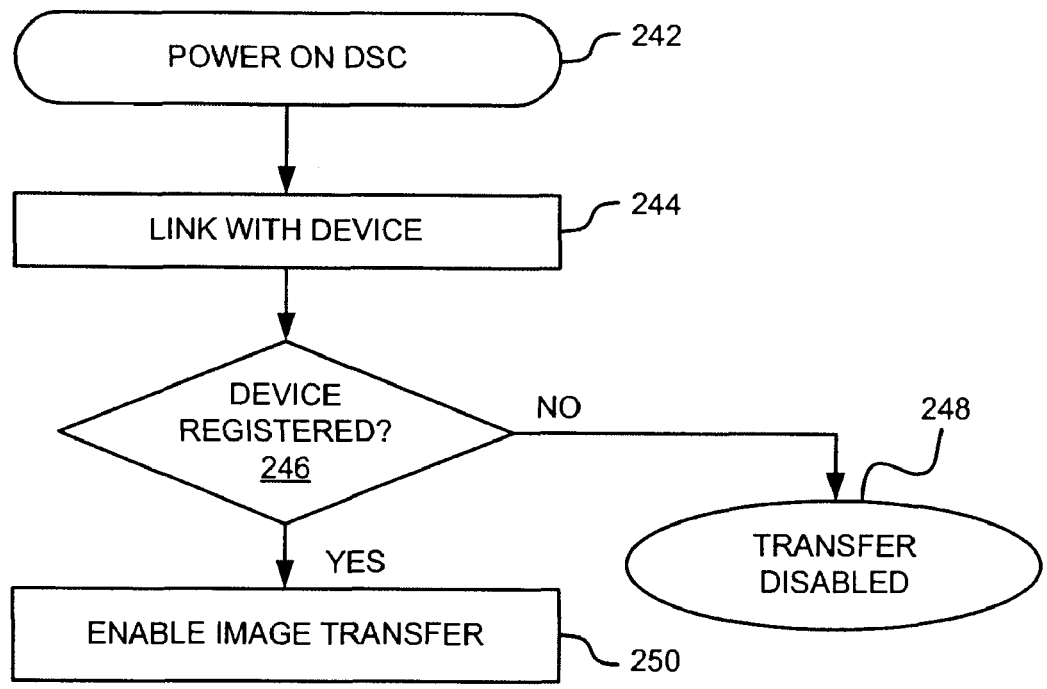
FIG. 11 is an operational flow diagram illustrating a process for linking with 132 that was registered as an associated device and transferring images thereto in accordance with one embodiment of the invention.

FIG. 11 is an operational flow diagram illustrating a process for linking with laptop 132 that was registered as an associated device and transferring images thereto in accordance with one embodiment of the invention. Referring now to FIG. 11, as stated in the above example scenario, the user registered her laptop 132 as an authorized device to receive captured images. When the user powers on camera 100 in step 242 and camera 100 is linked with laptop 132 in step 244, camera 100 checks to ensure that laptop 132 is appropriately registered (step 246). If the computer or other device with which camera 100 is linked is not a registered device, operations with that device are disabled as illustrated by steps 246 and 248. If, on the other hand, the device is registered, operations can proceed. Accordingly, because laptop 132 was registered as a device authorized to receive images, in a step 250 image transfer between camera 100 and laptop 132 is enabled. Accordingly, camera 100 can send image data 132 to the properly authenticated laptop 132. As noted previously, encrypted image data can be decrypted at camera 100 or software installed at laptop 132 can decrypt the images for viewing.

The scenario described above with reference to FIGS. 8, 9, 10 and 11 illustrated an example scenario where a user authorized a laptop computer 132 as an authorized recipient of image data and further authorized a watch 138 as a key to enable operation of camera 100. As this example operational scenario serves to illustrate, various features and functionality or other operational scenarios might be associated with one or more devices in accordance with various embodiments of the invention. As a further example, in another embodiment, camera 100 can be utilized to associate various user settings with different users depending on the key selected. For example, consider a scenario where a camera 100 is shared between two users, and each user has his or her own key. In this example, each user can store his or her setting preferences in camera 100 and these preferences can be recalled when the key is recognized by camera 100. Accordingly, when camera 100 recognizes the presence of a first key for the first user, camera 100 recalls that user's stored settings associated with that key. Likewise, when camera 100 recognizes a second key associated with a second user, camera 100 recalls those settings associated with that second user.

Figure 12:
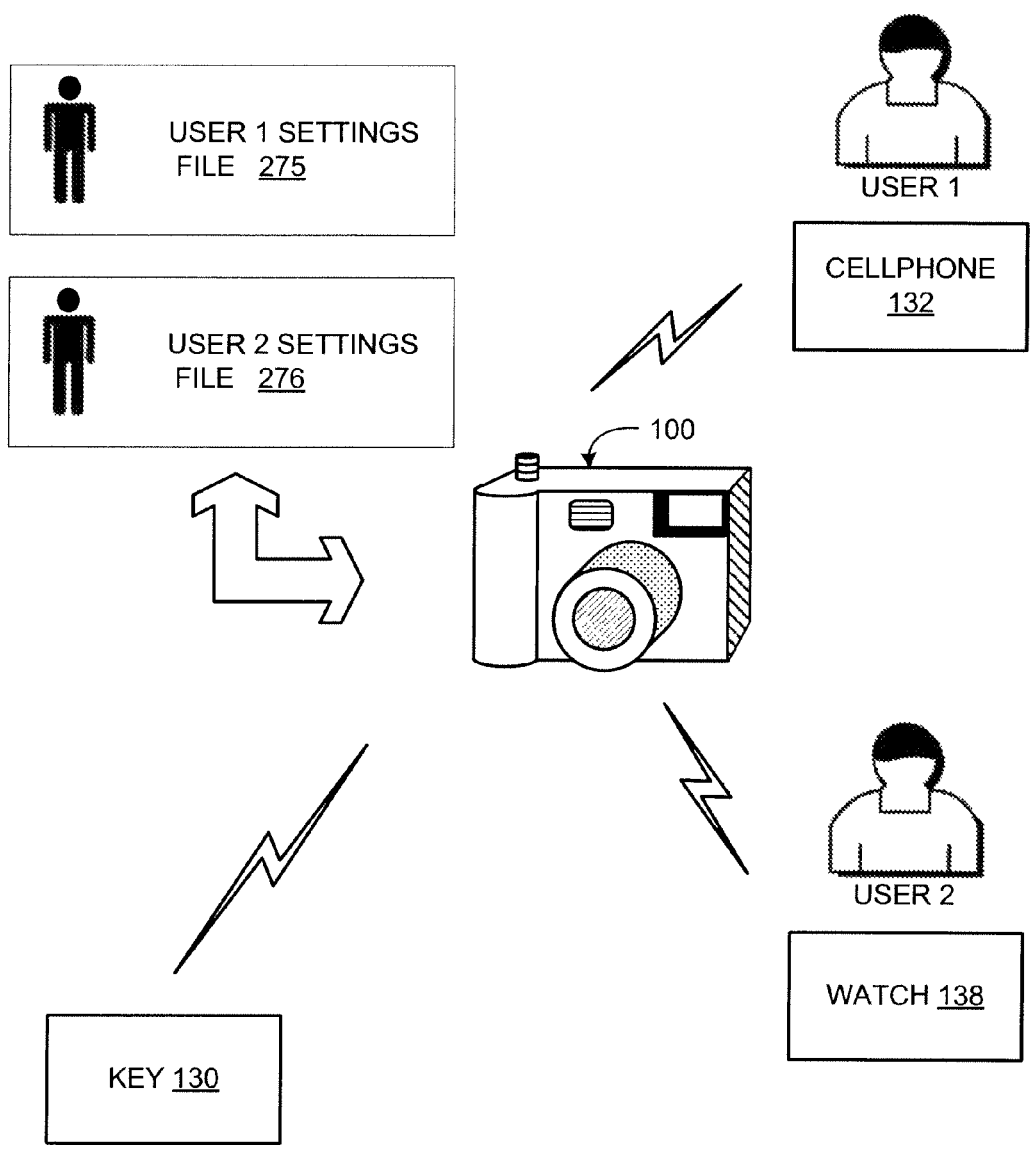
FIG. 12 is a diagram illustrating a camera associated with two users in accordance with one embodiment of the invention.
Figure 13:
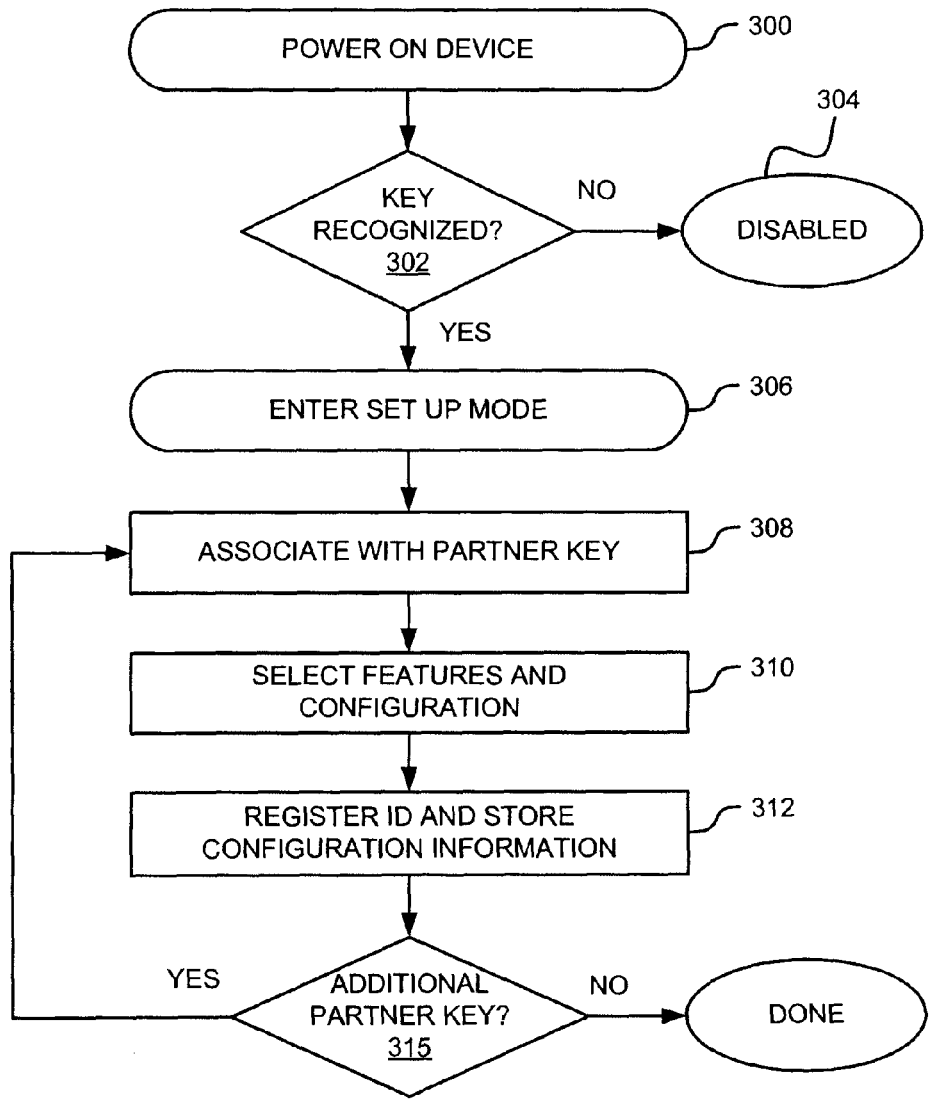
FIG. 13 is an operational flow diagram illustrating the process of configuring camera with a plurality of keys in accordance with one embodiment of the invention.

FIG. 12 is a diagram illustrating a camera 100 associated with two users in accordance with one embodiment of the invention. FIG. 13 is an operational flow diagram illustrating the process of configuring camera 100 with a plurality of keys in accordance with one embodiment of the invention. Referring now to FIGS. 12 and 13, in the illustrated example, user 1 wishes to register his cell phone 132 as a key for camera 130 and user 2 wishes to register her watch 138 as a key for camera 100. Also illustrated in FIG. 12, are two user files 275, 276, storing the appropriate user settings for user 1 and user 2, respectively. In one embodiment, these files 275, 276 are stored in internal memory in camera 100. In the example operational scenario illustrated in FIG. 13, when a user powers on a device at step 300, camera 100 looks for a valid key at step 302 and if no key is recognized, operation is disabled at step 304. In one embodiment, a user can use the master key 130 to enable camera 100 initially to enter the setup mode to define his or her personal key.

In a step 306 when master key 130 is recognized, the device can be powered on and can be entered into the setup mode. In a step 308, camera 100 is associated with the new key. In accordance with the above scenario, camera 100 is associated with user 1's cell phone 132. At step 310, user 1 selects the features for configuration information for cell phone 132. For example, in one embodiment, a user may be provided with the ability to select features such as various settings that are associated with his new key 132. As further illustration by way of example, a user may be provided with the ability to select a shooting mode, an image size or format, ISO settings, flash modes or other features or aspects of the camera. For example, shooting modes might include Automatic, Manual, Program, Shutter Priority, Aperture Priority, Macro Mode and so on. Image formats might include examples such as raw image data, JPG, TIFF or other format settings. As these examples illustrate, a user can be provided with the ability to select a configuration mode for camera 100 such that the camera can be automatically configured when it associates with that user's key.

In step 312, this configuration information can be stored, for example, in a user settings file 275. As illustrated by a step 315, additional partner keys can be associated with camera 100. Per the above-described example scenario, steps 308, 310 and 312 can be provided so that user 2 can appropriately register her watch 138 and the configuration information that she desires.

Figure 14:
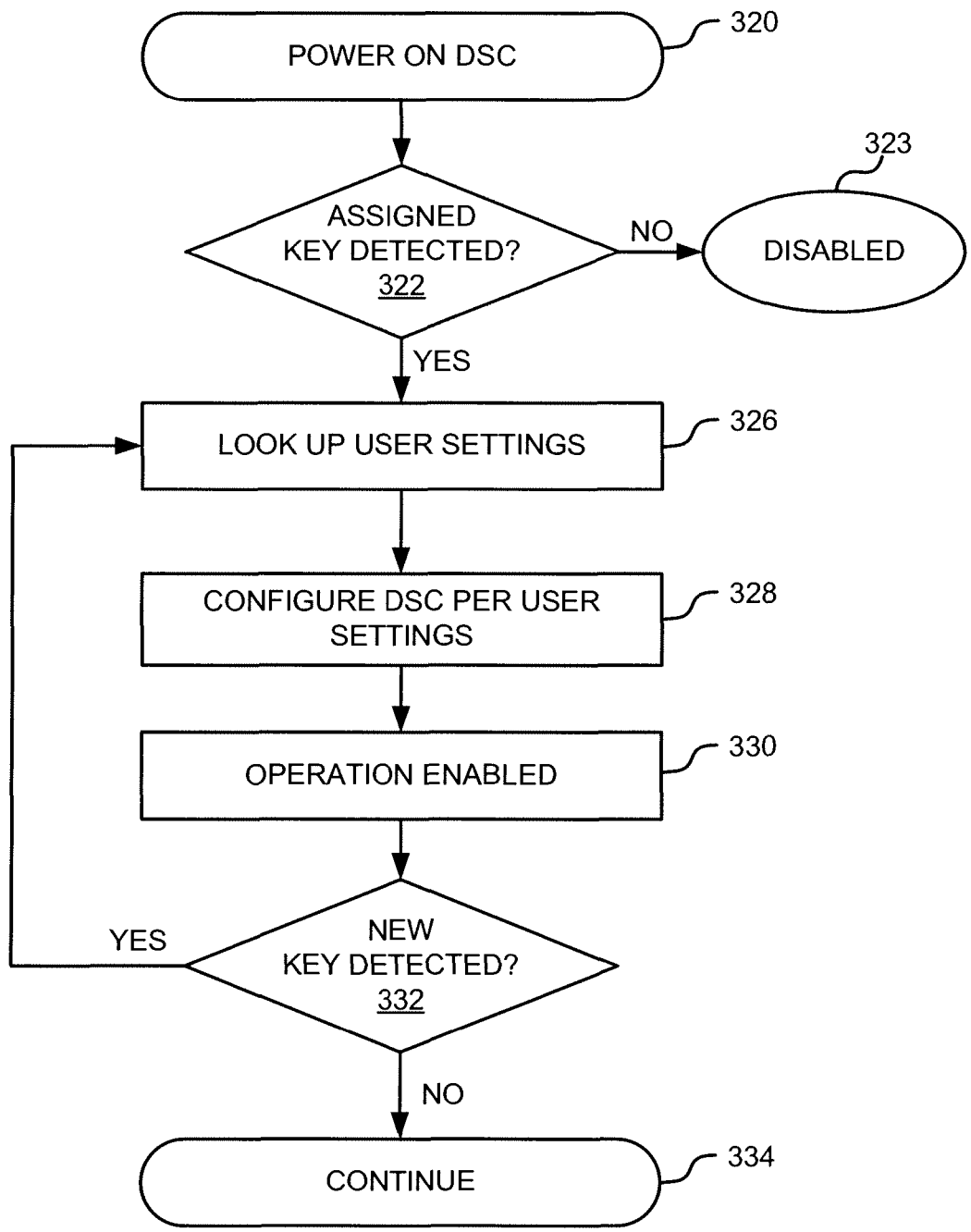
FIG. 14 is an operational flow diagram illustrating an example process for configuring camera in accordance with user-defined settings according to one embodiment of the invention.

FIG. 14 is an operational flow diagram illustrating an example process for configuring camera 100 in accordance with user-defined settings according to one embodiment of the invention. Referring now to FIG. 14, in a step 320, the user powers on camera 100. If, in a step 322, an assigned or approved key is not detected, operation of the camera is disabled (or not enabled) as illustrated by step 323. If, on the other hand, in a step 322 an approved key is detected, an identification of that key is determined. In a step 326, user settings associated with that key are retrieved. In a step 328, digital camera 100 configures itself per the user settings associated with the detected key and operation of the camera is enabled as illustrated by step 330. Accordingly, the camera powers on and is operational with the stored user settings.

If a new key is detected as illustrated by step 322, user settings can be looked up associated with the new key and the camera configured accordingly, otherwise, operation of the camera continues at step 334 until the camera is powered off or moves out of range of a valid key.

Preferably, the user can reconfigure the camera and change his or her settings. However, an initial set of cameral settings can be established. In one embodiment, key detection is performed each time camera 100 is turned on to perform features such as, for example, enabling the power on process, enabling operation of the camera, configuring features of the camera and the like. In another embodiment, key or device recognition is performed on a periodic basis to determine whether a valid key is still present or whether the camera is otherwise in proximity to or in communicative contact with one or more other devices.

Additional examples of a feature or function that can be controlled or managed by various devices are encryption keys, encryption algorithms or other encryption techniques. For example, in one embodiment, keys or seeds for keys can be maintained uniquely for each device type or device ID. Additionally, different encryption algorithms might be used for different device IDs or device types. To further illustrate, consider an example scenario where the device identifier is used as a seed to generate an encryption key on a user-by-user basis. For example, consider a scenario where a user has identified his or her own personal key for a digital camera to unlock the camera or to otherwise enable particular features or functions of the camera. The identifier for this key can be used a seed or can be used to obtain a seed to generate an encryption key unique to that user. This can be accomplished for a plurality of users with a plurality of different keys.

Figure 15:
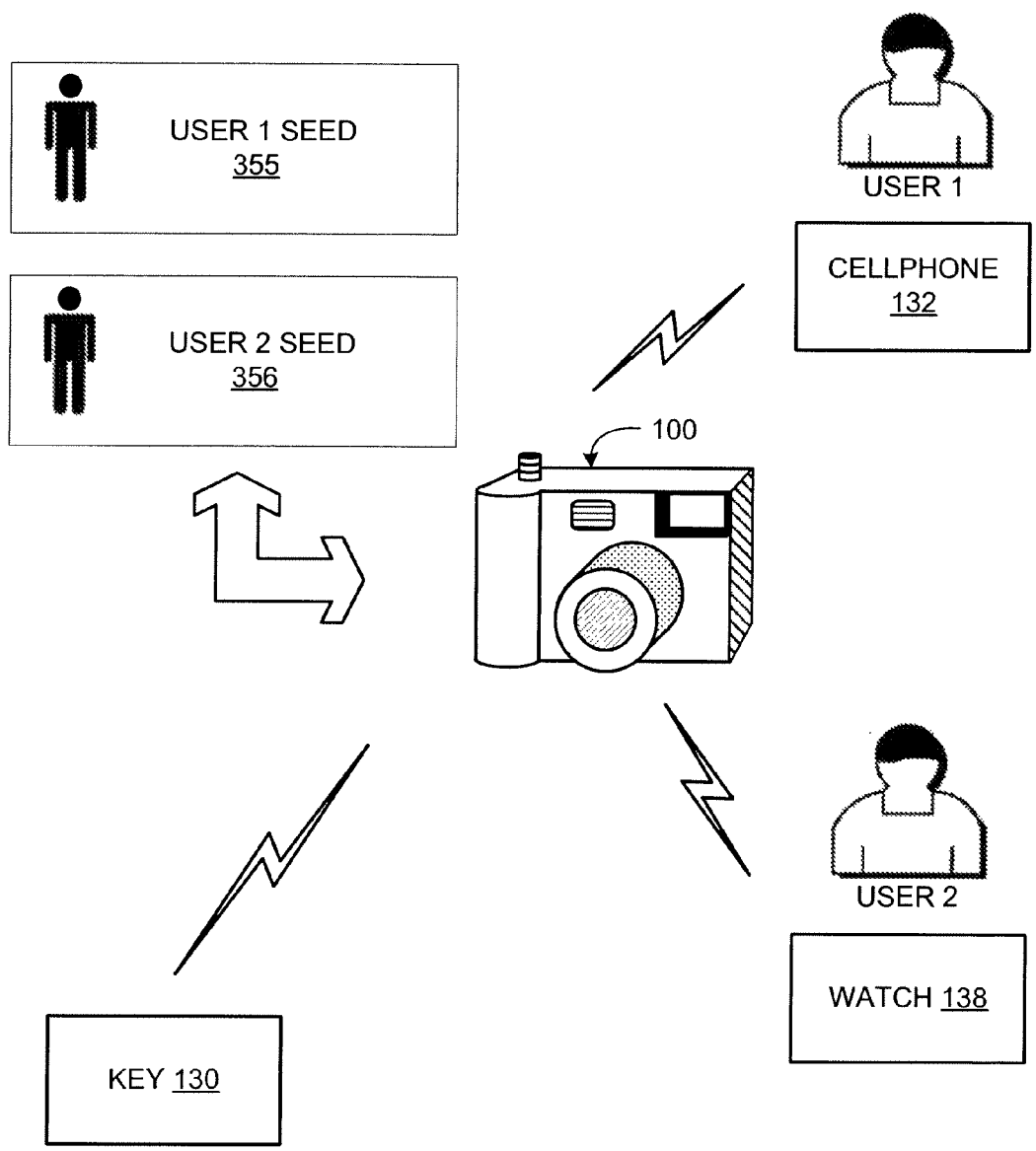
FIG. 15 is a block diagram illustrating an example scenario where there are two users, each having a personal key, and each key is used to generate a seed for the encryption algorithm.
Figure 16:
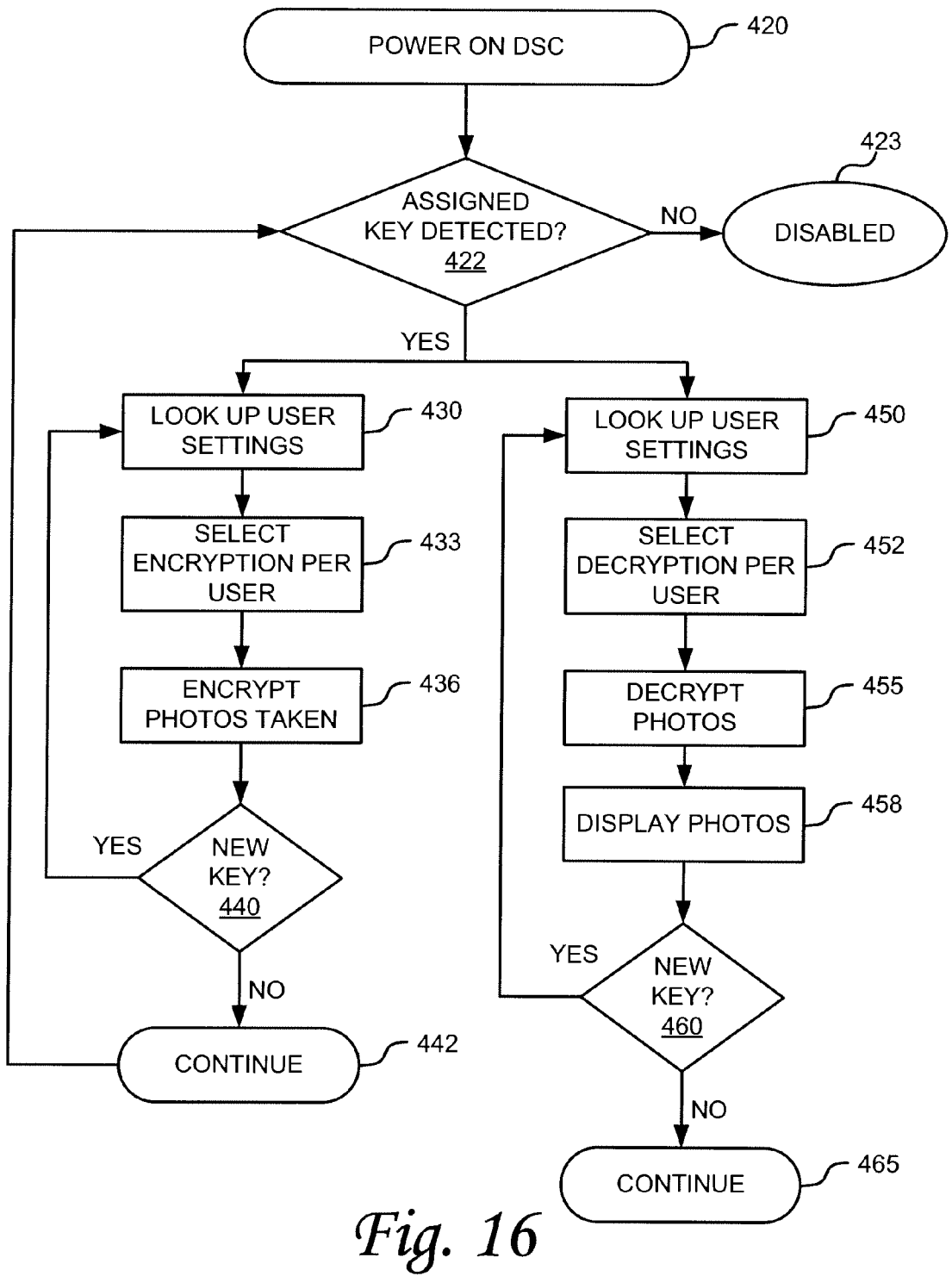
FIG. 16 is an operational flow diagram illustrating an example process for using this form of key management in accordance with one embodiment of the invention.

FIG. 15 is a block diagram illustrating an example scenario where there are two users, each having a personal key, and each key is used to generate a seed for the encryption algorithm. FIG. 16 is an operational flow diagram illustrating an example process for using this form of key management in accordance with one embodiment of the invention. In the example illustrated in FIG. 15, a scenario similar to that illustrated in FIG. 12 is provided. That is, a digital camera 100 has three keys associated with it: a master key 130, cell phone 132 as the key for user 1 and watch 138 as the key for user 2. In this example illustrated in FIG. 15, each of the two users has registered his or her respective key for use with digital camera 100. Further in this example, the ID from user 1's cell phone 132 is used as user 1 seed 355 or is used to generate user 1 seed 355. Likewise, the device ID of watch 138 (the key of user 2) is used to generate the user 2 seed 356 or is the user 2 seed 356.

Referring now to FIGS. 15 and 16, an operational example for this scenario is now described. In a step 420, a user powers on the digital camera 100. In a step 422, if no key is detected, the camera is disabled (as illustrated by step 423). If a key is detected, digital camera 100 looks up the user settings associated with that key, selects the encryption per the user and encrypts the photos taken. These steps are illustrated by steps 430, 433 and 436. In the current example, step 433 can be accomplished by designating the key ID as the seed or as the encryption key, selecting a seed or key based on the key ID, selecting encryption algorithms according to the key ID and so on. Additionally, other scenarios can be implemented wherein the device ID itself or other identification of a user associated with the device can be used to customize the encryption process unique to that particular user.

If a new key is detected, as illustrated by step 440, the process of looking up the user's settings, reselecting the encryption per that user and allowing encrypted photos to be taken continues for the user associated with the new key. As long as a key is active, the operation can continue and the camera can continue to take photographs and encrypt them per the identified user as illustrated in step 442.

Playback of images encrypted in this manner is illustrated on the right-hand side of FIG. 16. Particularly, when the camera is powered on and a particular user's key is identified, in a step 450, the camera looks up the user settings per the key identification. Accordingly, the appropriate decryption methodology can be implemented, the photos decrypted and displayed as illustrated by steps 452, 455 and 458. If a new seed, key or other encryption methodology is associated with the camera for playback, as illustrated by step 460, settings for this user can be looked up and images appropriately decrypted and displayed. This is illustrated by step 460. As long as an appropriate key is present, the operation of decrypting photos and displaying them for the user continues as illustrated by step 465.

The various embodiments described above at times reference particular scenarios with particular devices. As will be apparent to one of ordinary skill in the art after reading this description, the invention can be implemented in different scenarios with different devices. For example, the scenarios above describe feature recognition in terms of facial recognition and describe various embodiments using digital cameras, electronic photo albums, computers and the like. As these examples serve to illustrate, these embodiments can be implemented with a number of different parameters and a number of different electronic devices to facilitate utilization of the invention and its various features.

Figure 17:
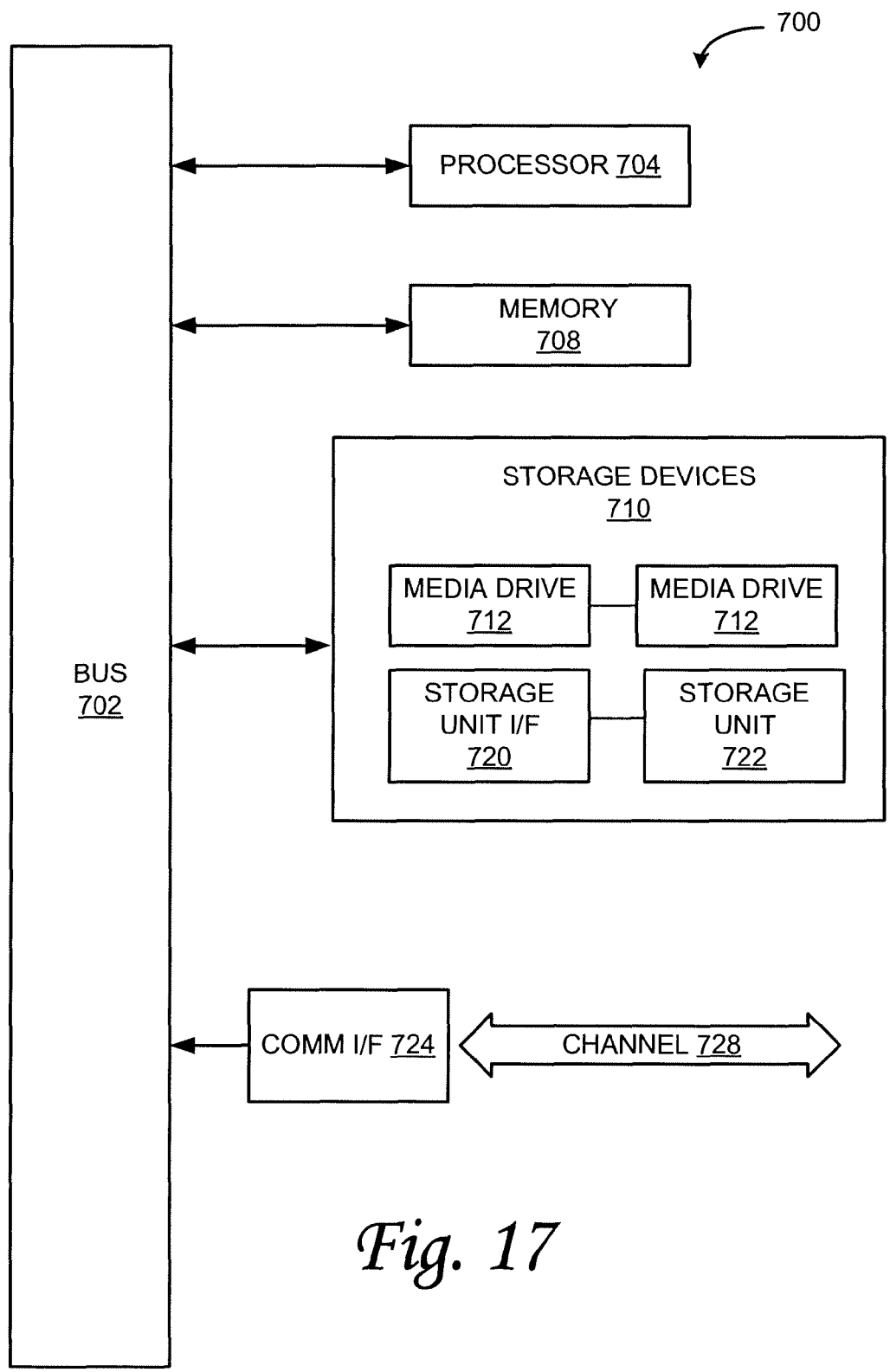
FIG. 17 is a block diagram illustrating an example computing module in accordance with one embodiment of the invention.

As used herein, the term module is used to describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 17. Various embodiments are described in terms of this example computing module 700. After reading this description, it will become apparent to a person skilled in the relevant art how to implement the invention using other computing modules or architectures.

Referring now to FIG. 17, computing module 700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special or general purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, modems, routers, WAPs, and any other electronic device that might include some form or processing capabilities.

Computing module 700 might include one or more processors or processing devices, such as a processor 704. Processor 704 might be implemented using a general-purpose or special-purpose processing engine such as, for example, a microprocessor, controller or other control logic. In the example illustrated in FIG. 7, processor 704 is connected to a bus 702 or other communication medium to facilitate interaction with other components of computing module 700.

Computing module 700 might also include one or more memory modules, referred to as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive. Accordingly, storage media 714, might include, for example, a hard disk, a floppy disk, magnetic tape, optical disk, a CD or DVD, or other fixed or removable medium that is read by, written to or accessed by media drive 712. As these examples illustrate, the storage media 714 can include a computer usable storage medium having stored therein particular computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, 802.XX or other interface), a communications port (such as for example, a USB port, IR port, RS232 port Bluetooth interface, or other port), or other communications interface. Software and data transferred via communications interface 724 might typically be carried on signals, which can be electronic, electromagnetic, optical or other signals capable of being exchanged by a given communications interface 724. These signals might be provided to communications interface 724 via a channel 728. This channel 728 might carry signals and might be implemented using a wired or wireless medium. Some examples of a channel might include a phone line, a cellular phone link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and signals on channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A digital camera, comprising:
a body;
an image sensor in the body;
a communications interface in the body and configured to receive first device information from a first external device, the first device information specifying an identification of the first external device as a master external device, and to receive second device information from a second external device;
a controller coupled to the communications interface and configured to control operations of the digital camera; and
executable code embodied in a non-transitory computer readable medium and configured to cause the controller to perform the functions of:
when the first external device is in communicative contact with the communications interface, allowing the digital camera to enter a configuration mode and, while in the configuration mode, registering the second device information as identifying the second external device as an authorized device;
when the first external device is in communicative contact with the communications interface, configuring operational parameters of the digital camera to conform to operational parameters identified as being associated with the first external device based on the first information received from the first external device identifying the first external device; and
when the second external device is in communicative contact with the communications interface, configuring operational parameters of the digital camera to conform to operational parameters identified as being associated with the second external device based on the second information received from the second external device identifying the second external device.

2. The digital camera of claim 1, wherein the executable code is further configured to cause the controller to: (a) store in the digital camera operational parameters associated with the first external device; (b) associate the first external device with the operational parameters stored in the digital camera; and (c) retrieve the operational parameters associated with the first external device upon receipt of the information received from the first external device identifying the first external device.

3. The digital camera of claim 2, wherein the stored operational parameters are specified by a user during registration of the first external device.

4. The digital camera of claim 1, wherein the executable code is further configured to cause the controller to enable operation of the digital camera when the first external device or the second external device is in communicative contact with the communications interface, and to disable operation of the digital camera when the first external device or the second external device is not in communicative contact with the communications interface.

5. The digital camera of claim 1, wherein the executable code is further configured to unlock the digital camera when the first external device or the second external device is in communicative contact with the communications interface, and to lock the digital camera when the first external device or the second external device is not in communicative contact with the communications interface.

6. The digital camera of claim 1, wherein the executable code is further configured to cause the controller to encrypt images with a key based on the information received from the first or second external device.

7. The digital camera of claim 1, wherein the executable code is further configured to cause the controller to use the first information received from the first external device or the second information received from the second external device to determine whether the first external device or the second external device is authorized to receive images from the digital camera and to allow transfer of images to the first external device or the second external device only if the first external device or the second external device is authorized to receive images from the camera.

8. The digital camera of claim 1, wherein the executable code is further configured to set the configuration of the digital camera based on the first information received from the first external device or the second information received from the second external device.

9. The digital camera of claim 1, wherein the first information received from the first external device comprises a first device ID and the second information received from the second external device comprises a second device ID.

10. The digital camera of claim 9, wherein the first device ID comprises a first MAC address and the second device ID comprises a second MAC address.

11. A digital camera, comprising:
a body;
an image sensor in the body;
a communications interface in the body and configured to receive first device information from a first external device, the first device information specifying an identification of the first external device as a master external device, and to receive second device information from a second external device;
a controller coupled to the communications interface and configured to control operations of the digital camera; and
executable code embodied in a non-transitory computer readable medium and configured to cause the controller to perform the functions of:
when the first external device is in communicative contact with the communications interface, allowing the digital camera to enter a configuration mode and, while in the configuration mode, registering the second device information as identifying the second external device as an authorized device;
when the first external device is in communicative contact with the communications interface, encrypting captured images with a first key based on the first information received from the first external device identifying the first external device; and
when the second external device is in communicative contact with the communications interface, encrypting captured images with a second key based on the second information received from the second external device identifying the second external device.

12. The digital camera of claim 11, wherein the first information received from the first external device comprises a first device ID and the first device ID is used as the first key or used to generate the first key for encrypting images captured by the digital camera, wherein the first key is specific to the first external device; and wherein the second information received from the second external device comprises a second device ID and the second device ID is used as the second key or used to generate the second key for encrypting images captured by the digital camera, wherein the second key is specific to the second external device.

13. The digital camera of claim 12, wherein the executable code is further configured to cause the controller to decrypt images encrypted with the first key using a first decryption key based on the first device ID of the first external device, and to decrypt images encrypted with the second key using a second decryption key based on the second device ID of the second external device.

14. The digital camera of claim 11, wherein the executable code is further configured to cause the controller to transfer captured images to the first external device or the second external device after determining that the first external device or the second external device is authorized to receive the captured images.

15. The digital camera of claim 11, wherein the executable code is further configured to cause the controller to decode the captured images prior to transferring them to the first external device or the second external device.

16. A digital camera, comprising:
a body;
an image sensor in the body;
a communications interface in the body and configured to receive first device information from a first external device, the first device information specifying an identification of the first external device as a master external device, and to receive second device information from a second external device;
a controller coupled to the communications interface and configured to control operations of the digital camera; and
executable code embodied in a non-transitory computer readable medium configured to cause the controller to perform the functions of:
when the first external device is in communicative contact with the communications interface, allowing the digital camera to enter a configuration mode and, while in the configuration mode, registering the second device information as identifying the second external device as an authorized device;
when the first external device is in communicative contact with the communications interface, setting the configuration of the digital camera to conform to operational parameters identified as being associated with the first external device based on the information received from the first external device identifying the first external device; and
when the second external device is in communicative contact with the communications interface, setting the configuration of the digital camera to conform to operational parameters identified as being associated with the second external device based on the second information received from the second external device identifying the second external device.

17. The digital camera of claim 16, wherein the first information received from the first external device comprises a first device ID the second information received form the second external device comprises a second device ID, and the executable code is configured to cause the controller to, when the first external device is in communicative contact with the communications interface, retrieve operational parameters for the digital camera associated with the first device ID, and to configure the digital camera according to the retrieved operational parameters; and, when the second external device is in communicative contact with the communications interface, retrieve operational parameters for the digital camera associated with the second device ID, and to configure the digital camera according to the retrieved operational parameters.

18. The digital camera of claim 17, wherein the camera configuration comprises camera settings specific to the first or second external device or to a plurality of devices associated with the first or second device ID.

19. The digital camera of claim 16, wherein the executable code is configured to cause the controller to automatically retrieve the operational parameters and configure the digital camera when the first or second external device comes into communicative contact with the digital camera.

20. A method for controlling operational parameters of a digital camera, comprising:
establishing a first communication link with a first external device;

receiving first device information from the first external device, the first device information specifying an identification of the first external device as a master external device;

while the first communications link is established, allowing the digital camera to enter a configuration mode and, while in the configuration mode, registering second device information as identifying a second external device as an authorized device;

while the first communications link is established, configuring operational parameters of the digital camera to conform to operational parameters identified as being associated with the first external device based on the first information received from the first external device identifying the first external device, wherein the operational parameters are stored in a non-transitory computer readable medium; and establishing a second communication link with the second external device;

receiving the second device information from the second external device, the second device information specifying an identification of the second external device as an authorized device; and while the second communications link is established, configuring operational parameters of the digital camera to conform to operational parameters identified as being associated with the second external device based on the second device information received from the second external device identifying the second external device, wherein the operational parameters are stored in a non-transitory computer readable medium.

21. The method of claim 20, further comprising:
storing in the digital camera operational parameters associated with the first external device,
associating the first external device with the operational parameters stored in the digital camera; and retrieving the operational parameters associated with the first external device upon receipt of the first information received from the first external device identifying the first external device.

22. The method of claim 20, wherein configuring operational parameters comprises configuring the digital camera to be enabled for operation when the first or second external device is in communicative contact with the communications interface, and disabled when the first or second external device is not in communicative contact with the communications interface.

23. The method of claim 20, wherein configuring operational parameters comprises configuring the digital camera to encrypt images using a key based on the information received from the first or second external device.

24. The method of claim 20, wherein configuring operational parameters comprises setting a digital camera configuration based on the information received from the first or second external device.

* * * * *